US012562371B2

(12) United States Patent
Predtechenskiy et al.

(10) Patent No.: US 12,562,371 B2
(45) Date of Patent: Feb. 24, 2026

(54) METHOD FOR PRODUCING ANODE PASTE FOR LITHIUM-ION BATTERY

(71) Applicant: MCD Technologies S.a r.l., Leudelange (LU)

(72) Inventors: Mikhail Rudolfovich Predtechenskiy, Novosibirsk (RU); Alexandr Alexandrovich Khasin, Moscow (RU); Oleg Filippovich Bobrenok, Novosibirsk (RU); Andrey Gennadievich Kosolapov, Novosibirsk (RU)

(73) Assignee: MCD Technologies S.a r.l., Leudelange (LU)

( * ) Notice: Subject to any disclaimer, the term of this patent is extended or adjusted under 35 U.S.C. 154(b) by 487 days.

(21) Appl. No.: 17/927,484

(22) PCT Filed: Jul. 23, 2021

(86) PCT No.: PCT/RU2021/050237
§ 371 (c)(1),
(2) Date: Nov. 23, 2022

(87) PCT Pub. No.: WO2022/086371
PCT Pub. Date: Apr. 28, 2022

(65) Prior Publication Data
US 2023/0246166 A1 Aug. 3, 2023

(30) Foreign Application Priority Data
Oct. 19, 2020 (RU) .......................... RU2020134119

(51) Int. Cl.
| | |
|---|---|
| *H01M 4/1395* | (2010.01) |
| *H01M 4/04* | (2006.01) |
| *H01M 4/131* | (2010.01) |
| *H01M 4/134* | (2010.01) |
| *H01M 4/1391* | (2010.01) |
| *H01M 4/38* | (2006.01) |
| *H01M 4/48* | (2010.01) |
| H01M 4/02 | (2006.01) |
| H01M 4/62 | (2006.01) |

(52) U.S. Cl.
CPC ....... *H01M 4/1395* (2013.01); *H01M 4/0404* (2013.01); *H01M 4/131* (2013.01); *H01M 4/134* (2013.01); *H01M 4/1391* (2013.01); *H01M 4/386* (2013.01); *H01M 4/483* (2013.01); *H01M 2004/021* (2013.01); *H01M 2004/027* (2013.01); *H01M 4/621* (2013.01); *H01M 4/622* (2013.01)

(58) Field of Classification Search
CPC .... H01M 4/134; H01M 4/386; H01M 4/1395; H01M 4/131; H01M 4/483; H01M 4/1391; H01M 4/133; H01M 4/587; H01M 4/364; H01M 2004/027; H01M 2004/021; H01M 4/625; H01M 4/62; H01M 4/621; H01M 4/622; H01M 4/0404; H01M 4/366
See application file for complete search history.

(56) References Cited

U.S. PATENT DOCUMENTS

2022/0255060 A1* 8/2022 Oh ........................ H01M 4/134

FOREIGN PATENT DOCUMENTS

| | | | |
|---|---|---|---|
| BY | 10739 | C1 | 6/2008 |
| CN | 102891017 | A | 1/2013 |
| CN | 107331440 | A | 11/2017 |
| CN | 108390027 | A | 8/2018 |
| CN | 109694507 | A | 4/2019 |
| CN | 110085866 | A | 8/2019 |
| EP | 3680961 | A1 | 7/2020 |
| JP | 2015167127 | A | 9/2015 |
| KR | 20200047286 | A | 5/2020 |
| RU | 2 382 799 | C2 | 3/2008 |
| RU | 2696479 | C1 | 8/2019 |
| RU | 2731884 | C1 | 9/2020 |
| WO | 2021/091426 | A1 | 10/2020 |
| WO | WO 2020/197670 | * | 10/2020 |
| WO | WO 2021/025349 | * | 2/2021 |

OTHER PUBLICATIONS

Search Report in PCT/RU2021/050237 dated Nov. 25, 2021.
Supplemental Search Report in EP 21 88 3393 dated Jun. 12, 2025.
Office Action in EP 21 88 3 393.7.

* cited by examiner

*Primary Examiner* — Laura Weiner
(74) *Attorney, Agent, or Firm* — Bardmesser Law Group

(57) ABSTRACT

The invention relates to electrotechnical industry, more particularly to lithium-ion batteries, and even more particularly to lithium-ion batteries with silicon-containing negative electrode (anode). The invention provides a method for producing an anode slurry (paste), an anode slurry (paste), a method for producing an anode for a lithium-ion battery, an anode for a lithium-ion battery, and a lithium-ion battery with a high initial specific capacity and a long cycle life with a large number of charge-discharge cycles over which the battery retains at least 80% of its initial capacity. This result becomes possible due to the presence in the anode material of bundles of single-walled and/or double-walled carbon nanotubes having a length of less than 5 μm, together with bundles of single-walled and/or double-walled carbon nanotubes having a diameter of more than 500 nm and a length of more than 10 μm.

17 Claims, 9 Drawing Sheets

$2\theta \, / \, °$

50 μm

METHOD FOR PRODUCING ANODE PASTE FOR LITHIUM-ION BATTERY

BACKGROUND OF THE INVENTION

Field of the invention

The invention relates to electrical industry, and in particular, to lithium-ion batteries, and more particularly, to lithium-ion batteries with silicon-containing negative electrodes (anodes), as well as to anodes of lithium-ion batteries.

Conventional Art

Silicon-containing negative electrodes (anodes) have a number of advantages when used in lithium-ion batteries, with the main one being their high specific capacity, theoretically reaching 4200 mA·h/g. However, such materials generally have a shorter operational life, i.e., the number of charge-discharge cycles over which they retain their capacity, compared to anodes based on carbon materials. This is related to the fact that interaction of silicon (density 2.33 g/cm$^3$) with lithium to form the Li$_{22}$Si$_5$ phase (density 0.96 g/cm$^3$, weight fraction of silicon 48 wt. %) in battery charging results in the increase of the volume of particles of an active component by 400% (5-fold). Upon multiple repeating of charge-discharge cycles, voids are formed between silicon particles comprising the composite material of anode, which coalesce into cracks, and after several cycles the anode loses its integrity, which results in electrical isolation of parts of anode and leads to a drop in the battery capacity. Ultimately, the anode is completely destroyed. This is the main problem limiting wider application of silicon and silicon-containing anodes in lithium-ion batteries.

To ensure the efficiency of silicon-containing anodes over a sufficiently large number of charge-discharge cycles of lithium-ion battery, both the integrity of silicon-containing anodes and the high conductivity of the material must be ensured. Manufacturing a silicon-containing anode having a high specific capacity, e.g., over 500 mA·h/g of anode material, and capable of retaining this capacity for a sufficiently large number of charge-discharge cycles, e.g., retain over 80% of the initial capacity for more than 500 cycles, is a challenging technical problem, a solution to which is provided by the present invention.

As used herein, the term "anode material" refers to a composite material of anode without a current collector. As used herein, the term "active anode material" refers to a combination of substances in anode chemically reacting with lithium in the course of charging the battery, such as graphite, silicon, silicon oxide (SiO), etc.

To ensure operation for multiple charge-discharge cycles without loss of battery capacity, a number of patents and research publications suggest using a silicon-carbon composite as the active material of the negative electrode, having lower relative volume change in the process of lithiation in the course charging. However, this approach does not solve the problem, as it has an inherent limitation related to the linear dependence of the specific capacity of the anode material on the relative change of its volume upon lithiation. Thus, a lower relative change in volume means a lower specific capacity of the battery.

Another suggested solution is to create a porous structure in the silicon-containing anode material in advance, so that formed lithium silicide would fill these pores. This allows preserving the integrity of the composite aggregates for several dozens of charge-discharge cycles.

Thus, U.S. Pat. No. 8,263,265, SAMSUNG SDI CO., Sep. 11, 2012, and U.S. Pat. No. 8,617,746, SAMSUNG SDI CO., Dec. 5, 2013 provide a Si/C nanocomposite from porous particles of silicon, into pores of which particles of crystalline or amorphous carbon are embedded. U.S. Pat. No. 8,263,265 also provides a method for producing such composite, which comprises mixing an alkaline or alkaline earth metal with a silicon oxide nanocomposite with crystalline or amorphous carbon, thermal treatment of such composite to reduce silicon oxide and form the alkaline or alkaline earth metal oxide, and thermal processing of thus obtained composite in an acid to remove the alkaline or alkaline earth metal oxide. The anode material of the cited disclosures has the first charge capacity of 847-855 mA·h/g and retains 73-78% of the initial capacity after 50 cycles.

The discussed solutions have two major drawbacks: (1) complicated method for obtaining the anode material and its subsequent application onto the anode current collector, requiring a substantial modification of the existing process for manufacturing lithium-ion batteries, and (2) insufficient increase in useful life of the anode material that still remains short compared to graphite anode materials due to recrystallization of silicon in the Si/C composite and gradual destruction of the created porous structure.

Another solution to obtain an active anode material with a long useful life is to introduce fibrous carbon particles into the silicon-containing anode material not only as a conductive, but also as a reinforcing, additive. Reinforcement of the composite material is known to be achievable by introduction of additives having an intrinsic high strength, with preferable use of elongated particles, such as fibers, and the larger the length-to-thickness ratio, the lower the volume fraction of the additive is sufficient to produce the reinforcement effect. EP 2755263 B1, LG CHEM, Jan. 3, 2018 provides an active anode material comprising a porous composite "silicon oxide—carbon material" that comprises porous silicon oxide and "linear-like" carbon material deposited on the surface and/or in the pores of porous silicon oxide, wherein the linear-like material is carbon nanofibers, carbon nanotubes, or a mixture thereof, the average pore diameter of porous silicon oxide is in the range of 10 nm to 1000 nm if measured from the surface of porous silicon oxide, the average diameter of the linear-like carbon material is in the range of 5 nm to 200 nm, and its average length is in the range of 100 nm to 5 μm. Using this composite as the active material for producing an anode slurry/paste (together with a conductive component, such as acetylene black, and a binder, such as PVDF) and then for manufacturing anode of lithium-ion battery produces a lithium-ion battery with an increased number of charge-discharge cycles sustained by an aggregate (grain) of the composite material without destruction. Furthermore, the composite material retains conductivity even after development of an internal crack. The attained specific capacity is 1568 mA·h/g, and 95% of the material capacity is retained at cycle 49.

Drawbacks of the solution provided in EP 2755263 B1 include weak mechanical bonding and poor conductivity between the aggregates (grains) of the composite material, which necessitates introduction of a substantial amount of the conductive component and binder into the anode slurry in addition to the porous composite "silicon oxide—carbon material" to achieve the required parameters of the anode material (in the examples of the disclosure, their content is 20 wt. %). Introduction of such a substantial amount of inert substances with respect to the chemical process of lithiation lowers the specific capacity of the anode. The second major drawback of the solution provided in EP 2755263 B1 is a technically challenging process of obtaining such composite "silicon oxide-carbon material," as is requires application of a metal catalyst over silicon oxide and further involves a technologically challenging and energy-consuming step of forming the linear-like carbon material over thus deposited metal catalyst, e.g., using Chemical Vapor Deposition.

The active anode material of EP 2755263 B1 is the closest to the anode slurry and the anode material provided in the present invention, and EP 2755263 B1 has been adopted as a prototype with respect to anode slurry/paste and anode material in the present invention.

The solution which is the closest to the present invention with respect to the method for producing an anode slurry and the method for manufacturing anode is U.S. Pat. No. 8,697, 286, SAMSUNG ELECTRONICS, Apr. 15, 2014, providing a method comprising: grinding of non-carbon material and hollow carbon nanofibers in an organic solvent to obtain a mixture, drying the mixture to produce an active anode material comprising secondary particles of agglomerated primary nanoparticles, with the primary nanoparticles comprising hollow carbon fibers attached to the non-carbon material; mixing the active anode material with a polymer binder having an electron donor group and a solvent to produce a composition of the active anode material, applying the composition of the active anode material onto a current collector and drying the applied composition of the active anode material to form an anode, wherein the average particle size of non-carbon material is in the range of about 10 nm to about 50 nm, and the secondary particles have a maximum particle size of about 50 μm, and wherein the hollow carbon nanofibers are single-walled nanotubes, multi-walled nanotubes, circular nanotubes, or a combination thereof. Example 1 and FIG. 8 of the cited publication indicate that thus produced anode has an initial capacity of 850 mA h/g, which reduces to 710 mA·h/g (83% of the initial capacity) within 20 charge-discharge cycles. Example 2 and FIG. 10 of the cited invention indicate that thus produced anode has an initial capacity of 1130 mA·h/g, which reduces to 800 mA·h/g (70% of the initial capacity) within 20 charge-discharge cycles.

Thus, the produced material has the same drawback as the material of EP 2755263 B1, i.e., nanocarbon nanofibers are included in the primary nanoparticles and thus affect the strength and integrity of the primary nanoparticles and possibly the secondary particles with the size less than 50 μm; however, the bond between the secondary particles in the anode material is weak, and the anode material in the course of charge-discharge cycles destroys along the boundaries of the secondary particles, which reduces the effective number of charge-discharge cycles over which the anode retains more than 80% of its initial capacity. U.S. Pat. No. 8,697,286 has been adopted as the prototype with respect to the method for producing an anode slurry (paste) and the method for manufacturing an anode in the present invention.

SUMMARY OF THE INVENTION

The invention provides a method for producing an anode slurry (paste), an anode slurry, a method for producing an anode for a lithium-ion battery, an anode for a lithium-ion battery, and a lithium-ion battery with a high initial specific capacity and a long cycle life with a large number of charge-discharge cycles, over which the battery retains not less than 80% of its initial capacity. The technical result of the provided disclosure is initial specific capacity of the anode of more than 500 mA·h/g, and retention by anode and lithium-ion battery of more than 80% of the initial capacity for at least 500 charge-discharge cycles at charge and discharge currents of at least 1 C. A further important technical result of the provided disclosure is simplicity of the process and the possibility of industrial application of the provided methods in the standard technologies for manufacturing lithium-ion batteries.

Achieving this technical result requires that the anode material for the lithium-ion battery contains a high concentration, such as more than 50 wt. %, of a silicon-containing active material comprising phases of silicon and/or silicon oxide $SiO_x$. Achieving this technical result further requires that the secondary agglomerates of nanoparticles or domains of silicon and/or silicon oxide $SiO_x$ in the anode material retain their integrity over numerous charge-discharge cycles. Achieving this technical result further requires that a strong mechanical and electrical bond exists between the secondary agglomerates of nanoparticles or domains of silicon and/or silicon oxide $SiO_x$ in the anode material, which is capable of providing anode integrity and conductivity over numerous charge-discharge cycles.

Achieving this technical result is made possible due to the presence of both bundles of single-walled and/or double-walled carbon nanotubes (SWCNT and/or DWCNT) with a length of less than 5 μm and bundles of single-walled and/or double-walled carbon nanotubes with a length of more than 10 μm, in the anode material. Thin and short bundles of single-walled and/or double-walled carbon nanotubes with a length of less than 5 μm ensure preservation of integrity of the secondary agglomerates of nanoparticles of silicon and/or silicon oxide $SiO_x$ upon their lithiation and delithiation during charge-discharge cycles, as well as provide electrical contact with these particles. Long bundles of single-walled and/or double-walled carbon nanotubes with a length of more than 10 μm ensure preservation of integrity of the anode material as a whole, preservation of the mechanical bond between the secondary agglomerates of nanoparticles of silicon and/or silicon oxide $SiO_x$ upon their lithiation and delithiation in the course of charge-discharge cycles, as well as provide conductivity over the entire anode layer. Creation of a network from bundles of carbon nanotubes comprising elements both having the length less than the characteristic dimension of the secondary agglomerates (less than 5 μm) and having the length more than the characteristic dimension of the secondary agglomerates (more than 10 μm) is not possible with prior art methods, including the method of U.S. Pat. No. 8,697,286. For a substantial fraction of bundles of carbon nanotubes to have the length of less than 5 μm it is sufficient that the mode of length distribution of the number of bundles of carbon nanotubes is less than 5 μm.

Achieving the required technical result can be ensured if the anode slurry is produced using a suspension of carbon nanotubes comprising both a substantial number of bundles of single-walled and/or double-walled carbon nanotubes with the length less than the characteristic dimension of the secondary agglomerates of the active material and a substantial number of bundles of single-walled and/or double-walled carbon nanotubes with the length substantially more than the characteristic dimension of the secondary agglomerates of the active material, and perform mixing of the active material with such suspension using methods, wherein shear forces are not sufficient to destroy carbon nanotubes and their bundles. Many such methods are known, including but not limited to, e.g., overhead stirrers with impellers of various forms, drum mixers, planetary mixers, etc. The size distribution of bundles of single-walled and/or double-walled carbon nanotubes, characteristic of the used suspension, will be preserved in the anode slurry, and further in the anode.

The size distribution of the number of suspended particles (such as bundles of carbon nanotubes) is commonly determined by Dynamic Light Scattering (DLS). Dynamic light scattering can determine the diffusion coefficient of the suspended particles $D_{diff}$, which is related to the effective hydrodynamic diameter $D_h$ via the well-known Stokes-Einstein relation (1), $$D_{diff} = \frac{kT}{3\pi\eta D_h}, \qquad \text{[Eq. 1]}$$

which for the cylindrical particles (nanotubes and their bundles) having length L and diameter d, taking into account averaging over all possible orientations, is provided by equation (2)

$$D_{diff} = \frac{kT}{3\pi\eta L}\left[\ln\left(\frac{L}{d}\right) + 0.32\right] \qquad \text{[Eq. 2]}$$

See N. Nair, W. Kim, R. D. Braatz, M. S. Strano, "Dynamics of Surfactant-Suspended single-walled Carbon Nanotubes in a Centrifugal Field", Langmuir, 2008, Vol. 24, pp.1790-1795, doi: 10.1021/la702516u, or, considering the particles as oblong ellipsoids, by equation (3)

$$D_{diff} = \frac{kT}{3\pi\eta L\sqrt{1 - (d/L)^2}}\ln\left[\frac{1 + \sqrt{1 - (d/L)^2}}{(d/L)}\right] \qquad \text{[Eq. 3]}$$

See J. Gigault, I. Le Hécho, S. Dubascoux, M. Potin-Gautier, G. Lespes, *Single-walled carbon nanotube length determination by asymmetrical-flow field-flow fractionation hyphenated to multi-angle laser-light scattering*, J. Chromatogr. A, 2010, Vol. 1217, pp.7891-7897. Both models of Eq. (2) and (3) yield very similar values for the shape factor, showing the factor by which, the length of the bundle exceeds its effective hydrodynamic diameter. Taking into account that the length to diameter ratio for the overwhelming majority of nanotube bundles in suspension is certainly in the range of 100 to 10000, the shape factor lies in a narrow range of 5 to 10. Because of this, the length of the bundle of carbon nanotubes, L, can be estimated up to a factor of 2 from the value of the effective hydrodynamic diameter by inequalities (4):

$$5D_h < L < 10D_h \qquad (4)$$

Thus, to create a network from bundles of carbon nanotubes comprising elements both having the length of less than the characteristic dimension of the secondary agglomerates (less than 5 μm) and having the length of substantially more than the characteristic dimension of the secondary agglomerates (more than 10 μm), it is necessary to produce the anode slurry using a suspension of carbon nanotubes with the mode of hydrodynamic diameter distribution of the bundles of carbon nanotubes of less than 500 nm, wherein more than 5 wt. % of carbon nanotubes of the total carbon nanotubes in the suspension (C) are bundled single-walled or double-walled carbon nanotubes with a bundle length of more than 10 μm. Mixing of the silicon-containing active component with such suspension does not destroy the bundles of single-walled or double-walled carbon nanotubes and does not change their length. Because of this, in the anode material produced from such suspension, the length distribution of the bundles of carbon nanotubes will be characterized by a mode of less than 5 μm, and more than 5 wt. % of carbon nanotubes of the total carbon nanotubes in the anode material will be bundled single-walled or double-walled carbon nanotubes with a bundle length of more than 10 μm.

Preferably, the hydrodynamic diameter distribution of the number of agglomerates (bundles) of carbon nanotubes in the suspension is bimodal, such as with the lower mode of less than 500 nm and the higher mode of more than 2 μm; however, the technical result can also be achieved in the case of unimodal distribution but broadened into the range of larger agglomerate sizes.

Single-walled and double-walled carbon nanotubes are known to be capable of agglomerating to form bundles, wherein nanotubes are bound to each other by van der Waals forces (p-p interaction). Multi-walled carbon nanotubes do not form such bundles and are prone to form coil-like agglomerates which do not provide the required advantages in ensuring the integrity of the anode material. The higher the number of nanotubes bundled, the larger its length. Dispersion of single-walled or double-walled carbon nanotubes in the suspension of water or organic solvent results in destroying the bundles and decreasing the bundle sizes. The larger the amount of deposited energy (mechanical shear or ultrasound processing), the smaller the size of bundles of carbon nanotubes. The task of obtaining the suspension of single-walled and/or double-walled carbon nanotubes with the mode of hydrodynamic diameter distribution of agglomerates (bundles) of carbon nanotubes of the less than 500 nm, wherein a substantial amount, such as more than 5 wt. %, of carbon nanotubes are also present in bundles with the length of more than 10 μm, can be solved by various methods. One possible method is to produce two or several suspensions with different degrees of dispersion of the bundles of single-walled and/or double-walled carbon nanotubes with their subsequent mixing. The methods to produce such suspensions are outside the scope of the present disclosure.

The present invention provides a method to produce anode slurry with a dry residue comprising a high concentration of more than 50 wt. % and less than 99.9 wt. % of active component, which is a phase of silicon or phases of silicon oxides, $SiO_x$, where x is a positive number less than or equal to 2, or a combination of phases of silicon and silicon oxide $SiO_x$ with the total atomic ratio of oxygen: silicon contents in the anode material of more than 0 and less than 1.8, and comprising more than 0.1 wt. % and less than 20 wt. % of carbon nanotubes, wherein the method comprises the following sequence of steps:

(1) introducing a composition (C) comprising the phase of silicon or phases of silicon oxides, $SiO_x$, where x is a positive number less than or equal to 2, or a combination of such phases with the total atomic ratio of oxygen:silicon contents in the combination of phases of more than 0 and less than 1.8, into a liquid-phase suspension (S) comprising 0.01 wt. % to 5 wt. % of carbon nanotubes, wherein more than 5 wt. % of carbon nanotubes of the total carbon nanotubes in the suspension (S) are bundled single-walled and/or double-walled carbon nanotubes with a bundle length of more than 10 μm and a mode of hydrodynamic diameter distribution of the number of bundles of carbon nanotubes in the suspension (S) is less than 500 nm, and (2) mixing the mixture of the composition (C) in the suspension (S) until a homogeneous slurry is obtained.

In certain embodiments of the method, to ensure rheological or adhesion properties of the slurry optimal for its subsequent application on the current collector, graphite and/or binder additives and/or dispersant and/or solvent may be introduced simultaneously with introducing the composition (C) comprising the combination of phases of silicon and silicon oxide $SiO_x$ into the suspension (S) comprising carbon nanotubes. In other applications, graphite and/or binder additives and/or dispersant and/or solvent may be introduced not simultaneously with introducing the composition (C) into the suspension (S), but rather at a separate step or at several process steps. Most often, the sequence of introducing the binder additives and/or dispersant and/or solvent has no effect on the achieved technical result.

The composition (C) is the active component of an anode material included in the anode slurry, i.e., the component that reacts with lithium during charging, and is a phase of silicon or phases of silicon oxides, $SiO_x$, where x is a positive number less than or equal to 2, or a combination of phases of silicon and silicon oxide $SiO_x$ with the total atomic ratio of oxygen:silicon contents in the anode material of more than 0 and less than 1.8. The phases of silicon oxides, $SiO_x$, imply both stoichiometric silicon oxide $SiO_2$ and non-stoichiometric silicon oxides. Particles and domains with a homogeneous chemical composition and coherent crystalline structure in the active component are agglomerated into joint agglomerates, often referred to as "secondary agglomerates" or "secondary particles" in the references.

Preferably, to achieve the best technical result, the sizes of domains with a coherent crystalline structure, also referred to as the sizes of the coherent-scattering domains (CSD) for the phases of silicon and silicon oxides, are less than 10 nm. However, note that the technical result can also be achieved when the composition (C) includes well-crystallized phases, e.g., with a dimension of CSR of more than 100 nm, and even when using mechanically ground monocrystalline silicon. Also preferably, with respect to processability and occupational safety (e.g., to avoid fine dust formation), the sizes of agglomerates, into which the particles and domains of silicon and silicon oxide are bundled, are distributed by diameter with the distribution median D50 of more than 5 µm. However, the main technical result, i.e., an increase in specific capacity and the number of charge-discharge cycles, can also be achieved when the median of distribution of the secondary agglomerates by diameter D50 is lower, such as between 1 µm and 3 µm.

Preferably, the active component of the anode material also contains carbon covering the surface of agglomerates of silicon and/or silicon oxide, and the ratio C:Si in the composition (C) is more than 0.01 and less than 0.1. This composition can be produced by various methods known in the art, including but not limited to CVD deposition of carbon at the surface of pre-ground silicon and/or silicon oxide. However, the main technical result can also be achieved when using the carbon-free composition (C). The coverage of the surface of agglomerates of silicon and/or silicon oxide with the carbon material will occur in the process of producing the anode slurry: upon mixing the composition (C) with the suspension (S), short bundles of single-walled and/or double-walled carbon nanotubes with the bundle length less than 5 µm cover the surface of agglomerates of silicon and/or silicon oxide.

The carbon nanotubes in the suspension should include single-walled carbon nanotubes and/or double-walled carbon nanotubes. The carbon nanotubes in the suspension may also include nanotubes with the number of graphene layers in the wall more than 2: multi-walled and/or few-walled carbon nanotubes, as well as other nanofiber forms of carbon. It is essential to achieve the technical result of the present invention that the weight fraction of bundled single-walled or double-walled carbon nanotubes with the bundle length of more than 10 µm is at least 5% of the total carbon nanotubes in the suspension. It is also essential for achieving the technical result of the present invention that the mode of hydrodynamic diameter distribution of the number of bundles of carbon nanotubes in the suspension (S) is less than 500 nm.

Preferably, the single-walled and double-walled carbon nanotubes have a low number of structural defects. The defect rate or perfection of the structure of single-walled and double-walled carbon nanotubes can be quantified by the ratio of G and D bands in the Raman spectrum. Preferably, the ratio of g/D bands in the Raman spectrum at wavelength 532 nm exceeds 5. Most preferably, the ratio of G/D bands in the Raman spectrum at wavelength 532 nm exceeds 50.

In certain embodiments of the method, the best technical result is achieved when the carbon nanotubes in the composite material contain functional groups on their surface comprising elements with the Pauling electronegativity higher than of carbon, including but not limited to, e.g., hydroxyl, carboxyl, chlorine-containing: —Cl, —O—Cl, fluorine-containing. The presence of such groups ensures the best adhesion of carbon nanotubes to the particles of an active component. The functional groups can be produced on the surface of carbon nanotubes by various methods known in the art. For example, carboxyl functional groups can be produced on the surface of carbon nanotubes by thermal processing in a solution of nitric acid, while chlorine-containing functional groups can be produced by one of the methods described in RU 2717516 C2, MCD TECH, Mar. 23, 2020, but not limited to the provided examples. The methods to functionalize carbon nanotubes are outside of the scope of the present invention.

In certain embodiments of the method, the best technical result is achieved when the suspension (S) contains more than 0.01 wt. % and less than 5 wt. % of carbon nanotubes in water. The suspension may additionally contain a dispersant, or a surfactant used in the production of the suspension, including but not limited to Na-carboxymethyl cellulose.

In other embodiments of the method, the best technical result is achieved when the suspension (S) contains more than 0.01 wt. % and less than 5 wt. % of carbon nanotubes in a polar organic solvent with a dipole moment more than 1.5 D. From the viewpoint of compatibility with the existing manufacturing process for lithium-ion batteries, the most preferred polar organic solvent to suspend carbon nanotubes is N-methylpyrrolidone (NMP); however, the main technical result can also be achieved when using the suspension of carbon nanotubes in another polar organic solvent, including but not limited to dimethyl acetamide or dimethyl sulfoxide. The suspension in a polar organic solvent may additionally contain a dispersant or a surfactant used in the production of the suspension, including but not limited to polyvinylpyrrolidone or polyvinylidene fluoride.

The present invention also provides an anode slurry with a dry matter comprising more than 50 wt. % and less than 99.9 wt. % of active component, which is a phase of silicon or phases of silicon oxides, $SiO_x$, where x is a positive number less than or equal to 2, or a combination of the phases of silicon and silicon oxide $SiO_x$ with a total atomic ratio of oxygen:silicon contents in the anode material of more than 0 and less than 1.8, and comprising more than 0.1 wt. % and less than 20 wt. % of carbon nanotubes, wherein more than 5 wt. % of carbon nanotubes of the total carbon nanotubes in the anode slurry are bundled single-walled and/or double-walled carbon nanotubes with a bundle length of more than 10 μm and the mode of length distribution of the number of bundles of carbon nanotubes in the anode slurry of less than 5 μm.

In some applications, preferably the anode slurry additionally comprises one or several binding polymer substances selected from the group comprising polyvinylidene fluoride, carboxymethyl cellulose or Li salt thereof, or Na salt thereof, polyacrylic acid or Li salt thereof, or Na salt thereof, styrene butadiene rubber or latex thereof, fluoroelastomer or latex thereof. The anode slurry may further comprise one or several dispersants selected from the group comprising carboxymethyl cellulose or Li salt thereof, or Na salt thereof, polyacrylic acid or Li salt thereof, or Na salt thereof, or polyvinylpyrrolidone.

To achieve the best technical result, in some applications, the anode slurry may preferably further comprise one or several conductive additives differing in their composition and structure from carbon nanotubes, including but not limited to carbon black, graphite, metals of groups 8-11 of the periodic table, including but not limited to iron, nickel, copper, silver. The metals of groups 8-11 of the periodic table may also be introduced into the anode slurry as impurities present in the suspension of carbon due to the method of production of the nanotubes.

The present invention also provides a method for producing the anode of a lithium-ion battery, wherein the method comprises the sequence of steps of (1) introducing the composition (C) comprising the phase of silicon or phases of silicon oxides, $SiO_x$, where x is a positive number less than or equal to 2, or a combination of such phases with a total atomic ratio of oxygen:silicon contents in the combination of the phases of more than 0 and less than 1.8, into a liquid-phase suspension (S) comprising 0.01 wt. % to 5 wt. % of carbon nanotubes, wherein more than 5 wt. % of carbon nanotubes of the total carbon nanotubes in the suspension (S) are bundled single-walled and/or double-walled carbon nanotubes with a bundle length of more than 10 μm and the mode of hydrodynamic diameter distribution of the number of bundles of carbon nanotubes in the suspension (S) is less than 500 nm; (2) mixing the mixture of the composition (C) in the suspension (S) until a homogeneous slurry is obtained; (3) applying the resultant slurry on a current collector; (4) drying the applied slurry to form the anode, and (5) compacting the anode to required density.

The present invention also provides a method for producing an anode for a lithium-ion battery, wherein the method comprises the sequence of steps of: (1) applying the anode slurry described above over a current collector; (2) drying the applied slurry to form the anode, and (3) compacting the anode to required density.

The present invention also provides an anode for a lithium-ion battery, wherein the anode is produced according to any of the methods described above.

The present invention also provides an anode for a lithium-ion battery with the anode material comprising a high concentration of more than 50 wt. % and less than 99.9 wt. % of active component, which is a phase of silicon or phases of silicon oxides, $SiO_x$, where x is a positive number less than or equal to 2, or a combination of the phases of silicon and silicon oxide $SiO_x$ with a total atomic ratio of oxygen:silicon contents in the anode material of more than 0 and less than 1.8, and comprising more than 0.1 wt. % and less than 20 wt. % of carbon nanotubes, wherein more than 5 wt. % of carbon nanotubes of the total carbon nanotubes in the anode material are bundled single-walled and/or double-walled carbon nanotubes with the bundle length of more than 10 μm and the mode of length distribution of the number of bundles of carbon nanotubes in the anode is less than 5 μm.

The present invention also provides a lithium-ion battery with the anode material comprising a high concentration of more than 50 wt. % and less than 99.9 wt. % of active component, which is a phase of silicon or phases of silicon oxides, $SiO_x$, where x is a positive number less than or equal to 2, or a combination of the phases of silicon and silicon oxide $SiO_x$ with a total atomic ratio of oxygen: silicon contents in the anode material of more than 0 and less than 1.8, and comprising more than 0.1 wt. % and less than 20 wt. % of carbon nanotubes, wherein more than 5 wt. % of carbon nanotubes of the total carbon nanotubes in the anode of the lithium-ion battery are bundled single-walled and/or double-walled carbon nanotubes with the bundle length of more than 10 μm and the mode of length distribution of the number of bundles of carbon nanotubes in the anode of the lithium-ion battery is less than 5 μm.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF EMBODIMENTS OF THE INVENTION

Reference will now be made in detail to the preferred embodiments of the present invention, examples of which are illustrated in the accompanying drawings.

For convenience, the information on the provided examples is also provided in the table below.

EXAMPLES

| Example | Composition of the suspension (S), wt. %; Fraction of CNT in the bundles having L > 10 μm, wt. %; $D_{hm}$, nm | Composition of anode material, wt. % | Specific capacity of the anode, mA · h/g | | |
|---|---|---|---|---|---|
| | | | Initial | After 50 cycles | After 500 cycles |
| 1 | 0.4% SWCNT 0.6% Na—CMC 99% water 19% in the bundles > 10 μm $D_{hm}$ = 400 nm | 90% C—Si/SiO$_x$ 3% SWCNT, 4.5% Na—CMC 2.5% SBR | 1296 | 1300 | 1050 |
| 2 | 0.4% SWCNT 0.8% BYK-LP N24710 (40 wt. % solution of undisclosed high-molecular polymeric additive in 1-methyl-2-pyrrolidone produced by BYK-Chemie GmbH) 98.8% NMP 54% in the bundles > 10 μm $D_{hm}$ = 370 nm | 90% C—Si/SiO$_x$ 3% SWCNT 6% BYK-LP N24710 1% PVDF | 1079 | 1116 | 868 |
| 3 | As in Example 1 | 86.3% C—Si/SiO$_x$ 5.3% SWCNT, 8.4% Na—CMC | 1160 | 1115 | 970 |
| 4 | 0.05% SWCNT + DWCNT 0.1% Li—CMC 99.95% water 12% in the bundles > 10 μm $D_{hm}$ = 360 nm | 94.9% Si/SiO$_x$ 0.73% SWCNT + DWCNT, 1.47% Li—CMC 2.9% SBR | 1481 | 1284 | 1193 |
| 5 | 0.4% SWCNT 3.0% MWCNT 1% PVP 95.6% NMP 6% in the bundles > 10 μm $D_{hm}$ = 450 nm | 80.8% C—Si/SiO$_x$ 12.1% CNT 3.6% PVP 3.6% Li—PA (lithium salt of polyacrylic acid) | 963 | 928 | 795 |
| 6 | 0.6% Cl, O— SWCNT (single-walled carbon nanotubes with functional groups containing chlorine and functional groups containing oxygen on their surface) (0.47% Cl & 2.2% O) 99.4% DMAA (dimethylacetamide, CH$_3$C(O)N(CH$_3$)$_2$) 28% in the bundles > 10 μm $D_{hm}$ = 420 nm | 88.4% C—Si/SiO$_x$ 8.2% Cl, O— SWCNT, 3.4% PVP | 1122 | 1081 | 937 |

-continued

| Example | Composition of the suspension (S), wt. %; Fraction of CNT in the bundles having L > 10 µm, wt. %; $D_{hm}$, nm | Composition of anode material, wt. % | Specific capacity of the anode, mA · h/g | | |
|---|---|---|---|---|---|
| | | | Initial | After 50 cycles | After 500 cycles |
| 7 | 0.25% F, O— SWCNT (single-walled carbon nanotubes with fluorine-containing functional groups on their surface) (14% F & 7% O) 99.75% NMP 9% in the bundles > 10 µm $D_{hm}$ = 370 nm | 94.9% C—Si/SiO$_x$ 3.1% F, O— SWCNT, 2.0% PVDF | 1257 | 1302 | 1117 |
| 8 | As in Example 1 | 50.1% C—Si/SiO$_x$ 3% SWCNT, 40.1% graphite 4.5% Na—CMC 2.3% SBR | 634 | 639 | 581 |
| 9 (comparative) | 0.4% SWCNT 0.6% Na—CMC 99% water <3% in the bundles > 10 µm $D_{hm}$ = 380 nm | 90% C—Si/SiO$_x$ 3% SWCNT 4.5% Na—CMC 2.5% SBR | 1241 | 1056 | 712 |

EXAMPLES

Example 1

Figure 1:
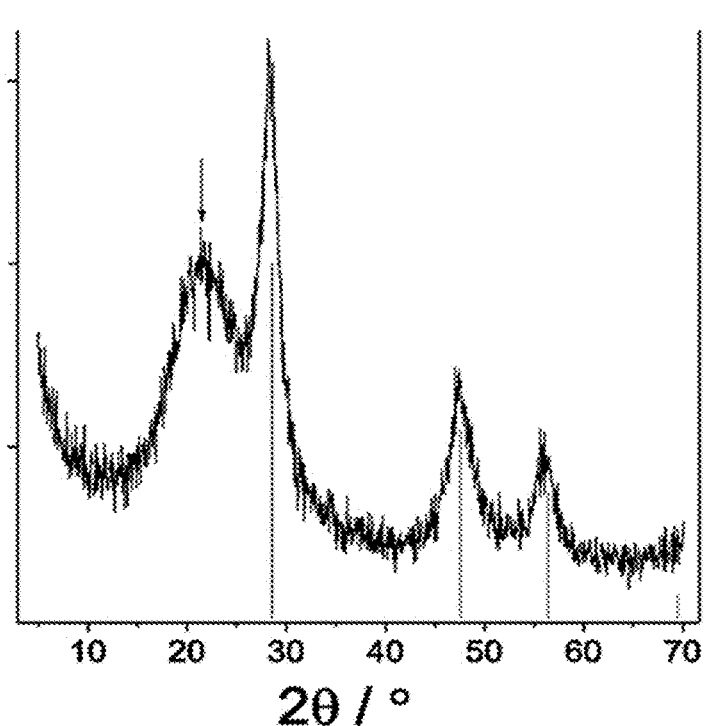
FIG. 1 shows an X-ray diffraction pattern from composition (C) used in Example 1.

The anode slurry was produced using a powder of composition (C) comprising a phase of silicon and phases of silicon oxide covered with a layer of amorphous carbon. Particle size distribution analysis of a composition (C) yields the median for powder particle diameter of 6.2 µm. X-ray diffraction pattern for the composition is shown in FIG. 1. This data may suggest that the composition includes phases of Si (Powder Diffraction File 27-1402) with the size of the coherent-scattering domain 5.0 nm and amorphized SiO$_x$ (a broad maximum in the region of 20-23° is the most intense diffraction line for the structure of christobalite, SiO$_2$) with the size of the coherent-scattering domain 1.5 nm. Data for changes in the weight of a sample of the composition (C) during temperature-programmed oxidation in the oxygen flow with rising temperature demonstrate that amorphous carbon accounts for 2.6 wt. % of the composition (weight loss at 700° C.), while oxygen deficit relative to stoichiometry SiO$_2$ is 14 wt. % of the initial weight of the composition (C) (weight gain in the range of 200 to 1400° C.). Thus, the total atomic ratio of oxygen:silicon contents in the combination of phases is 1.55. Weight ratio C:Si in the composition (C) is 0.048.

The anode slurry was produced using an aqueous suspension (S) of single-walled carbon nanotubes (SWCNT) TUBALL with a diameter of 1.2 to 2.1 nm and a mean diameter 1.6 nm (diameter was determined using TEM of the dry residue of the suspension, as well from the position of absorption bands S$_{1-1}$ in the optical absorption spectrum of the suspension). Raman spectroscopy at wavelength 532 nm reveals a pronounced G band at 1580 cm$^{-1}$ characteristic of single-walled carbon nanotubes, and D band at ca. 1330 cm$^{-1}$ characteristic of other allotropic modifications of carbon and defects of single-walled carbon nanotubes. The ratio of intensities of G/D bands is 75. SWCNT concentration in the suspension is 0.4 wt. %. The suspension also comprises 0.6 wt. % of Na-carboxymethyl cellulose (CMC) as a dispersant.

Figure 2:
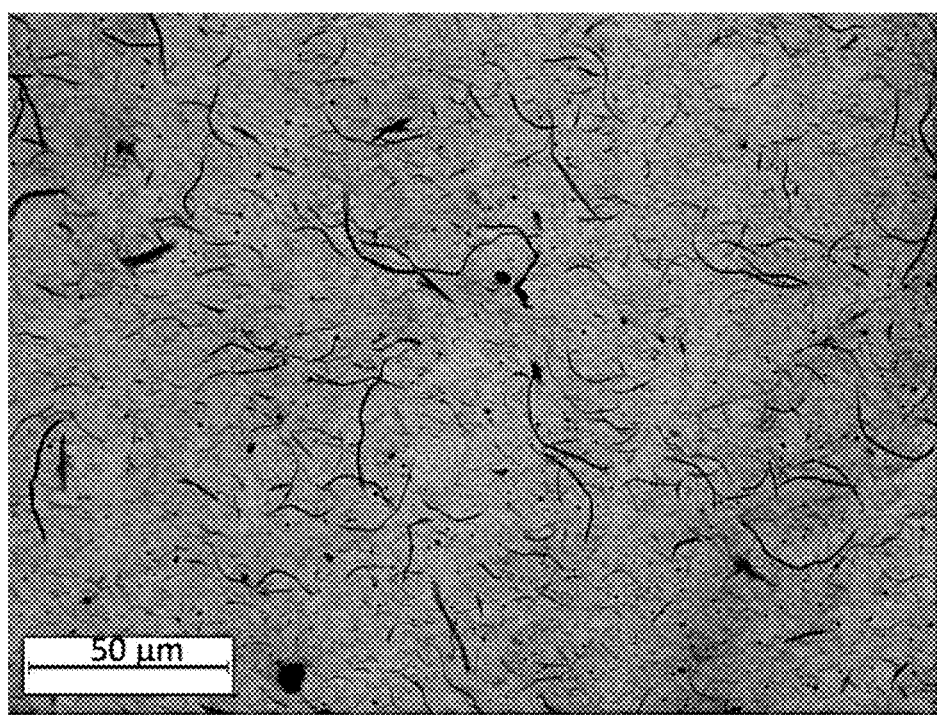
FIG. 2 shows a microphotograph of the suspension (S) used in Examples 1, 3, and 8.
Figure 3:
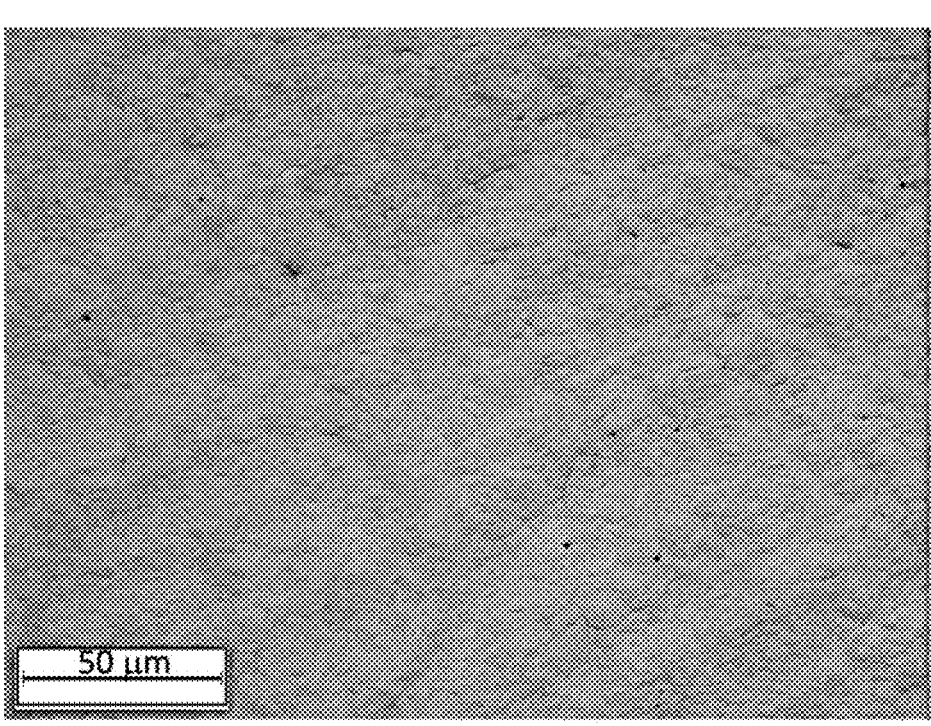
FIG. 3 shows a microphotograph of the suspension (S) used in Examples 1, 3, and 8 after sedimentation of long bundles of nanotubes by centrifuging.

The fraction of carbon nanotubes contained in bundles with the length more than 10 µm was determined by comparing optical density at 500 nm of the suspension (S) and the suspension after removal of long bundles from it by sedimentation via centrifuging at 8000 g for 1 hour. A microphotograph of the suspension placed between glasses is shown in FIG. 2. The microphotograph clearly shows long bundles of carbon nanotubes with a thickness up to 2 µm and the length of 10 to 50 µm. To determine the optical density, the suspension was diluted with water down to the SWCNT concentration in suspension of 0.001 wt. % (400 times). Before sedimentation, the suspension was diluted with water to the SWCNT concentration in the suspension of 0.01 wt. % (40 times). A microphotograph of the suspension after sedimentation by centrifuging is shown in FIG. 3. The microphotograph shows no long bundles of carbon nanotubes. The optical density of the suspension (S) diluted 400 times at the optical path length 10 mm is 0.56, which corresponds to the SWCNT concentration in the suspension (S) of 0.38 wt. %. The optical density of the suspension (S) diluted 40 times, subjected to sedimentation, and then further diluted 10 times is 0.45, which corresponds to the SWCNT concentration in the suspension (S) of 0.31 wt. %. Thus, the fraction of carbon nanotubes in long bundles of carbon nanotubes with the length more than 10 µm is 19 wt. % of the total amount of carbon nanotubes in the suspension.

Figure 4:
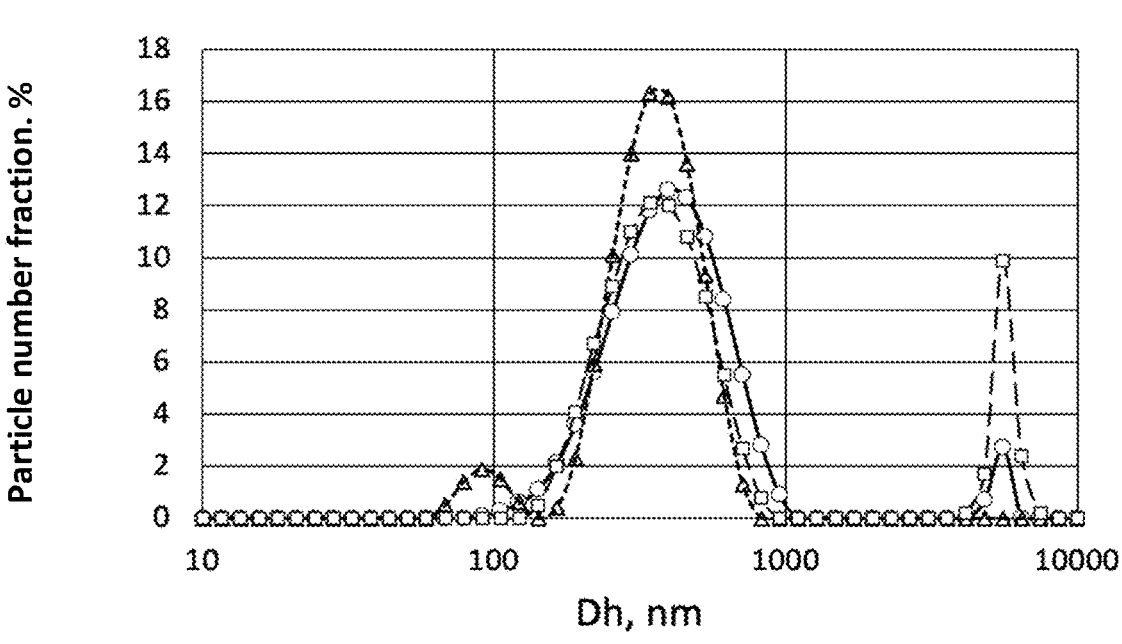
FIG. 4 shows DLS data on the hydrodynamic diameter distribution of the number of particles (nanotubes and their bundles) in the suspension (S) used in Examples 1, 3, and 8 (circles), in the suspension (S) used in Example 2 (squares), and in the suspension (S) used in Example 9 (triangles).

The size distribution of the number of bundles of carbon nanotubes was determined by Dynamic Light Scattering (DLS) of the suspension (S) diluted to the SWCNT concentration of 0.001 wt. %. The hydrodynamic diameter distribution of the number of particles (nanotubes and their bundles) in the suspension (S) obtained by DLS using a Malvern Zetasizer ZS instrument is shown in FIG. 4 by a curve with circular markers. Based on the data of FIG. 4, the size distribution of the number of bundles of nanotubes is bimodal, with hydrodynamic diameters in the ranges of 100-700 nm and 4-6 μm. The second mode of distribution corresponds to bundles of nanotubes with the length more than 10 μm, whose weight fraction was determined as described above to be about 19 wt. %. The first maximum corresponds to bundles with the length certainly less than 7 μm (<10×700 nm). This maximum is described by a log-normal hydrodynamic diameter distribution of the number of bundles, with the mode at Dhm=400 nm, which, according to inequality (4), means 2 μm<$L_m$<4 μm.

75 g of the suspension (S) was placed into a 150 cm³ beaker, and then 9 g of the composition (C) was added and mixed using an overhead stirrer with a disk impeller at impeller rotation speed 2000 rpm for 2 hours, then 1.25 g of 20 wt. % of butadiene-styrene latex was added, and, after additional mixing in the same conditions for another 15 min, a homogeneous anode slurry was obtained. The dry residue of the obtained anode slurry comprises 90 wt. % of the active component, 3 wt. % of carbon nanotubes, 4.5 wt. % of CMC, and 2.5 wt. % of butadiene-styrene rubber. 19 wt. % of carbon nanotubes in the resultant slurry are bundled single-walled carbon nanotubes with the bundle length of more than 10 μm. The bundles of single-walled carbon nanotubes are distributed by length bimodally, with a more intense mode at the length of 4 μm.

To produce the anode, the obtained anode slurry was applied on copper foil using a doctor blade, dried at 40° C. for 1 hour, and compactified at a calender with a 5 t force to a density of the anode material of 1.2 g/cm³. The load of the active material on the anode is 2.2 mg/cm². An anode with area 17.5 cm² was cut from the foil with anode material, to which a nickel lead was welded. No carbon nanotubes other than those introduced with the anode slurry were introduced into the anode. Thus, 19 wt. % of carbon nanotubes in the anode are bundled single-walled carbon nanotubes with the bundle length of more than 10 μm. The bundles of single-walled carbon nanotubes are distributed by length bimodally, with a more intense mode of distribution at a bundle length of less than 4 μm.

Figure 5:
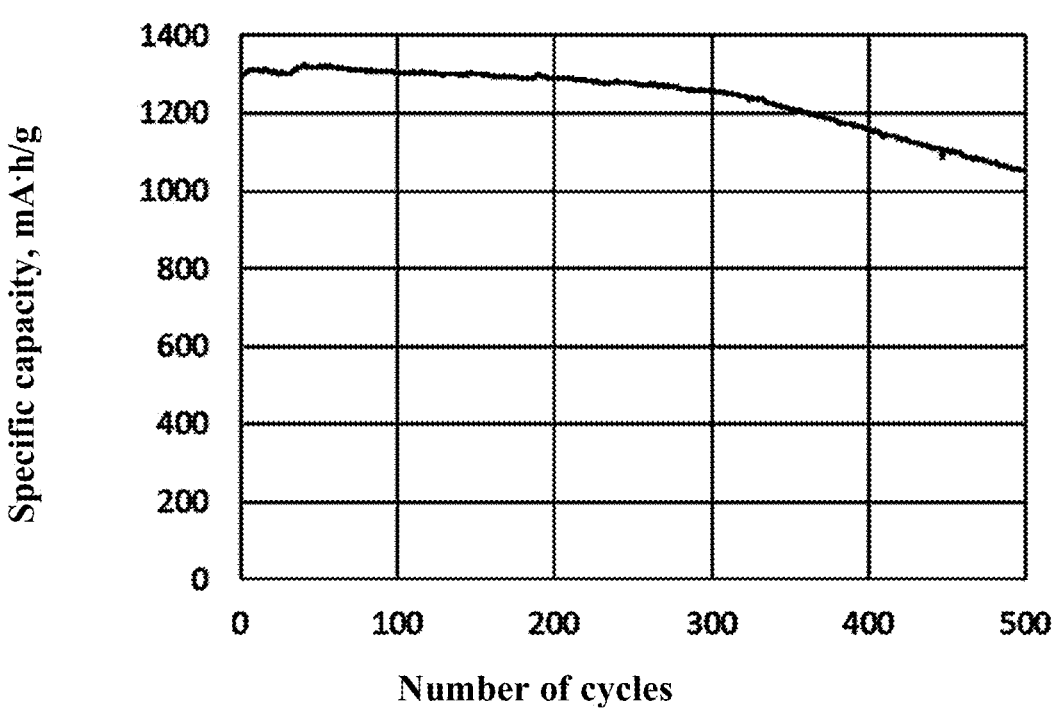
FIG. 5 shows dependence of the specific capacity of the anode of Example 1 on the number of charge-discharge cycles (charge current 2 A/g, discharge current 1 A/g).

To determine anode properties, a cell was assembled with a Li cathode and Li reference electrode and electrolyte using 1 M solution of $LiPF_6$ in the solvent mixture of propylene carbonate:ethylmethyl carbonate:dimethyl carbonate in volume ratio 1:1:1 with addition of 5% v/v vinyl carbonate. The initial specific capacity of the anode at charge current 2 A/g of the anode material is 1296 mA·h/g of the anode material. The specific capacity versus the number of charge-discharge cycles (charge current 2 A/g, discharge current 1 A/g) is shown in FIG. 5. The anode does not lose its specific capacity within first 50 cycles (1318 mA·h/g). After 500 cycles, the specific capacity of the anode is 1050 mA·h/g, i.e., more than 80% of the initial specific capacity.

Figure 6:
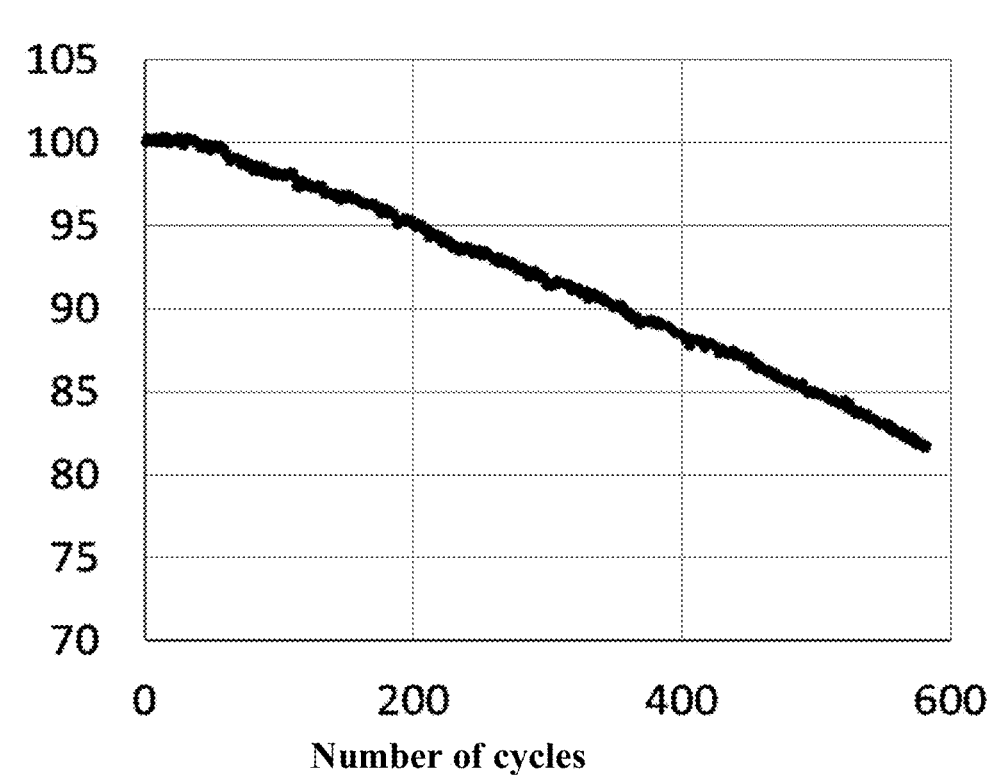
FIG. 6 shows capacity of the lithium-ion battery of Example 1 referred to its initial capacity versus the number of charge-discharge cycles (charge and discharge currents 46 mA).

A lithium-ion battery was assembled from the produced anode and a cathode having as the active material nickel-cobalt manganese oxide (NCM) with atomic ratio Ni:Co:Mn 6:2:2 at a load of 16 mg/cm². A 10 μm lithium foil was placed on the anode to increase the coulombic efficiency of the first cycle. A 25 μm thick polypropylene separator was used. 1 M solution of $LiPF_6$ in the solvent mixture propylene carbonate:ethylmethyl carbonate:dimethyl carbonate in volume ratio 1:1:1 with addition of 5% v/v vinyl carbonate was used as electrolyte. The initial capacity of the battery at discharge current 0.1 C was 46.5 mA·h. The dependence of the capacity referred to the initial capacity on the number of charge-discharge cycles (charge current 46 mA, discharge current 46 mA) is shown in FIG. 6. The battery does not lose its capacity within first 50 cycles (99.6%). After 500 cycles, the capacity of the battery is 39 mA·h, i.e., more than 83.5% of the initial capacity.

Example 2

The anode slurry was produced using the powder of the composition (C) as in Example 1. The anode slurry was produced using a suspension (S) of single-walled carbon nanotubes (SWCNT) TUBALL in N-methylpyrrolidone with dispersant BYK-LP N24710. The SWCNT diameter was distributed in the range of 1.2 to 2.1 nm with a mean diameter of 1.49 nm (the diameter was determined using TEM of the dry residue of the suspension, as well from the positions of absorption bands $S_{1-1}$ in the optical absorption spectrum of the suspension). Raman spectroscopy at wavelength 532 nm reveals a pronounced G band at 1580 cm$^{-1}$ characteristic of single-walled carbon nanotubes, and D band at ca. 1330 cm$^{-1}$ characteristic of other allotropic modifications of carbon and defects of single-walled carbon nanotubes. The ratio of intensities of G/D bands is 64. SWCNT concentration in the suspension is 0.4 wt. %. The concentration of dispersant BYK-LP N24710 is 0.8 wt. %.

Figure 7:
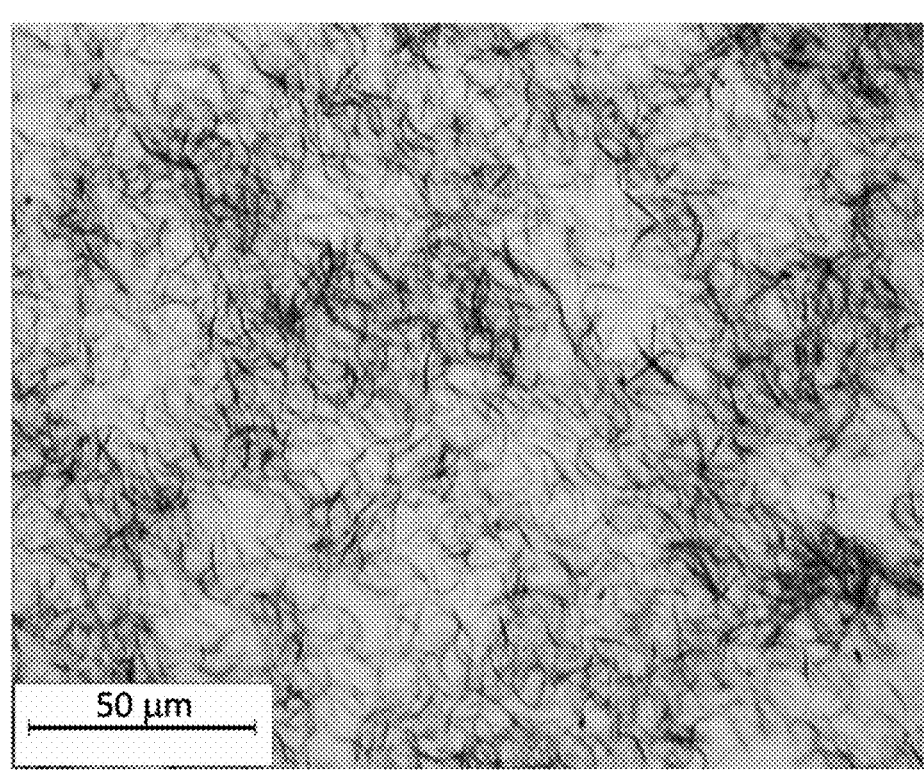
FIG. 7 shows a microphotograph of the suspension (S) used in Example 2.
Figure 8:
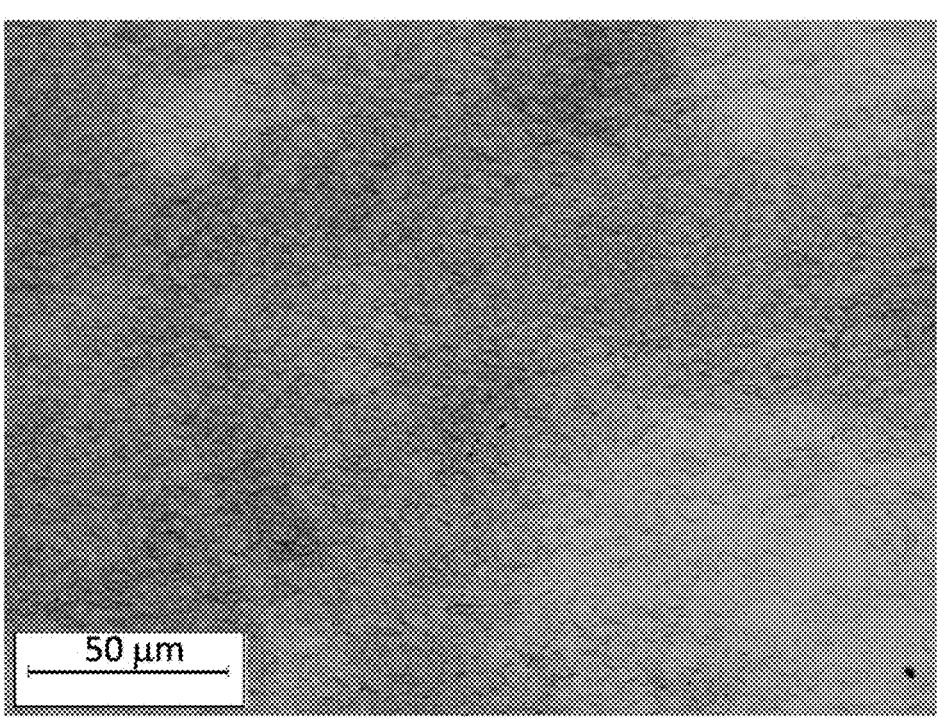
FIG. 8 shows a microphotograph of the suspension (S) used in Example 2 after sedimentation of long bundles of nanotubes by centrifuging.

The fraction of carbon nanotubes contained in bundles having the length more than 10 μm was determined by comparing optical density at 500 nm of the suspension (S) and suspension after removal of long bundles from it by sedimentation via centrifuging at 8000 g for 1 hour. A microphotograph of the suspension placed between glasses is shown in FIG. 7. The microphotograph clearly shows long bundles of carbon nanotubes with a thickness up to 2 μm and the length of 10 to 50 μm. To determine the optical density, the suspension was diluted with N-methylpyrrolidone down to the SWCNT concentration in suspension of 0.001 wt. % (diluted 400 times). Before sedimentation, the suspension was diluted with N-methylpyrrolidone to the SWCNT concentration in suspension of 0.01 wt. % (diluted 40 times). A microphotograph of the suspension after sedimentation by centrifuging is shown in FIG. 8. The microphotograph shows no long bundles of carbon nanotubes. The optical density of the suspension (S) diluted 400 times in a cuvette 10 mm thick is 0.56, which corresponds to the SWCNT concentration in the suspension (S) of 0.38 wt. %. The optical density of the suspension (S) diluted ×40, subjected to sedimentation, and then further diluted 10 times is 0.30, which corresponds to the SWCNT concentration in the suspension (S) of 0.21 wt. %. Thus, the fraction of carbon nanotubes in long bundles of carbon nanotubes with the length more than 10 μm is about 54 wt. % of the total amount of carbon nanotubes in the suspension.

The size distribution of the number of bundles of carbon nanotubes was determined by Dynamic Light Scattering (DLS) of the suspension (S) diluted ×400. The hydrodynamic diameter distribution of the number of particles (nanotubes and their bundles) in the suspension (S) obtained by DLS using a Malvern Zetasizer ZS instrument is shown in FIG. 4 by a curve with square markers. Based on the data of FIG. 4, the size distribution of the number of bundles of nanotubes is bimodal, with hydrodynamic diameters in the ranges of 100-700 nm and 4-8 μm. The second mode of distribution corresponds to bundles of nanotubes with the length more than 10 μm, whose weight fraction was determined as described above to be about 54 wt. %. The first mode corresponds to bundles with length certainly less than 8 μm (<10×800 nm). This maximum is described by a log-normal hydrodynamic diameter distribution of the number of bundles, with the mode at $D_{hm}=370$ nm, which, according to inequality (4), means 2.25 $\mu$m<$L_m$<3.7 $\mu$m.

400 g of the suspension (S) in NMP were placed into a glass beaker with a volume of 800 ml, and 47.7 g of the composition (C) were added and mixed using an overhead stirrer with a disk impeller at impeller rotation speed 2000 rpm for 30 min. Then 0.53 g of polyvinylidene fluoride powder, mixed in the same conditions for another 2 hours, were added, and a homogeneous anode slurry was obtained. The dry matter of the obtained anode slurry comprises 90 wt. % of the active component, 3 wt. % of carbon nanotubes, 6 wt. % of dispersant BYK-LP N24710, and 1 wt. % of polyvinylidene fluoride. 60 wt. % of carbon nanotubes in the resultant slurry are bundled single-walled carbon nanotubes with the bundle length of more than 10 $\mu$m. The bundles of single-walled carbon nanotubes are distributed by length bimodally, with the more intense mode at the length of less than 3.7 $\mu$m.

To produce the anode, the obtained anode slurry was applied on copper foil using a doctor blade, dried at 110° C. for 1 hour, and compactified at a calender with a 5 t force to a density of the anode material of 1.3 g/cm³. The load of the active material on the anode is 2.4 mg/cm². An anode with area 17.5 cm² was cut from the foil with anode material, to which a nickel lead was welded. No carbon nanotubes other than those introduced with the anode slurry were introduced into the anode. Thus, 54 wt. % of carbon nanotubes in the anode are bundled single-walled carbon nanotubes with the bundle length of more than 10 $\mu$m. The bundles of single-walled carbon nanotubes are distributed by length bimodally, with a more intense mode of the distribution at a bundle length of less than 3.7 $\mu$m.

Figure 9:
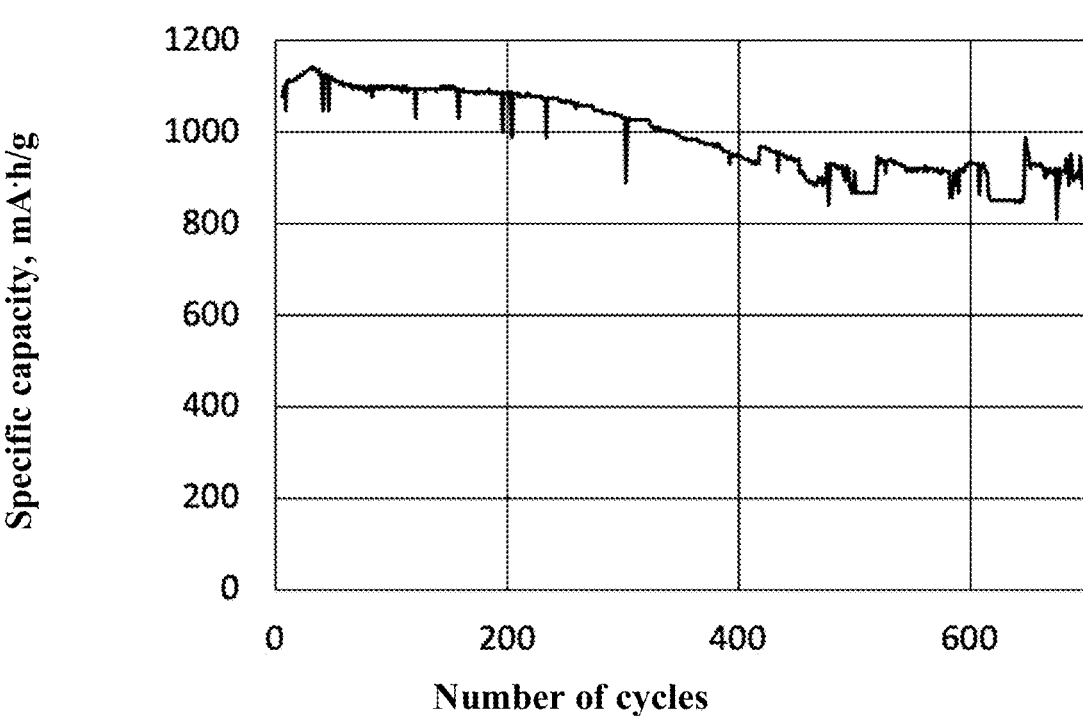
FIG. 9 shows specific capacity of the anode of Example 2 versus the number of charge-discharge cycles (charge current 2 A/g, discharge current 1 A/g).

To determine anode properties, a cell was assembled with a Li cathode and Li reference electrode and electrolyte using 1 M solution of $LiPF_6$ in the solvent mixture of propylene carbonate:ethylmethyl carbonate:dimethyl carbonate in volume ratio 1:1:1 with addition of 5% v/v vinyl carbonate. The initial specific capacity of the anode at charge current 2 A/g of anode material is 1079 mA·h/g of anode material. The specific capacity vs the number of charge-discharge cycles (charge current 2 A/g, discharge current 1 A/g) is shown in FIG. 9. The anode does not lose its specific capacity within first 50 cycles (1116 mA·h/g). After 500 cycles, the specific capacity of the anode is 868 mA·h/g, i.e., more than 80% of the initial specific capacity.

Example 3

The anode slurry was produced similarly to Example 1, however, as the composition (C) a dispersed silicon powder with dimension of CSR 60 nm and median of weight distribution of powder particles by diameter of 2.5 $\mu$m was used, and solvent, water, and Na-carboxymethyl cellulose dispersant were introduced into the suspension together with the composition (C). The composition (C) was wetted before introduction into the suspension (S) by a solution of Na-carboxymethyl cellulose to prevent fine silicon dust from getting into the workplace air. Based on the data for changes in the weight of a sample of the composition (C) in the course of temperature-programmed oxidation in the oxygen flow with rising temperature, the used silicon powder is partially oxidized and contains X-ray amorphous silicon oxide. Oxygen deficit relative to stoichiometry $SiO_2$ is 10.4 wt. % of the initial weight of the composition (C) (weight gain in the temperature range of 200 to 1400° C.). Thus, the total atomic ratio of oxygen: silicon contents in the combination of phases is 0.09.

2.0 g of the powder (C) pre-wetted with 10 g of aqueous solution of Na-carboxymethyl cellulose with a concentration of 0.1 wt. % were introduced into 30 g of the suspension (S), and mixed until a homogeneous slurry was obtained. The dry matter of the obtained anode slurry comprises 86.3 wt. % of the active component, 8.3 wt. % of Na-carboxymethyl cellulose, and 5.3 wt. % of carbon nanotubes. 19 wt. % of carbon nanotubes in the resultant slurry are bundled single-walled carbon nanotubes with the bundle length of more than 10 $\mu$m. The bundles of single-walled carbon nanotubes are distributed by the bundle length bimodally, with a more intense mode at a hydrodynamic diameter of 400 nm.

The anode was produced from the obtained anode slurry similarly to Example 1. The initial specific capacity of the anode at charge current 2 A/g of the anode material is 1160 mA·h/g of the anode material. After 50 charge-discharge cycles (charge current 2 A/g, discharge current 1 A/g), the specific capacity of the anode is 1115 mA·h/g. After 500 cycles, the specific capacity of the anode is 970 mA·h/g, i.e., more than 83% of the initial specific capacity. 19 wt. % of carbon nanotubes in the anode are bundled single-walled carbon nanotubes with the bundle length of more than 10 $\mu$m. The bundles of single-walled carbon nanotubes are distributed by length bimodally, with a more intense mode of distribution at a bundle length of less than 4 $\mu$m.

A lithium-ion battery was manufactured using the produced anode similarly to Example 1. The initial capacity of the battery at discharge current 0.1 C was 44.8 mA·h. Within first 50 charge-discharge cycles (charge current 45 mA, discharge current 45 mA), the battery does not lose its capacity (99.0%). After 500 cycles, the capacity of the battery is 37 mA·h, i.e., more than 82.5% of the initial capacity.

Example 4

Figure 10:
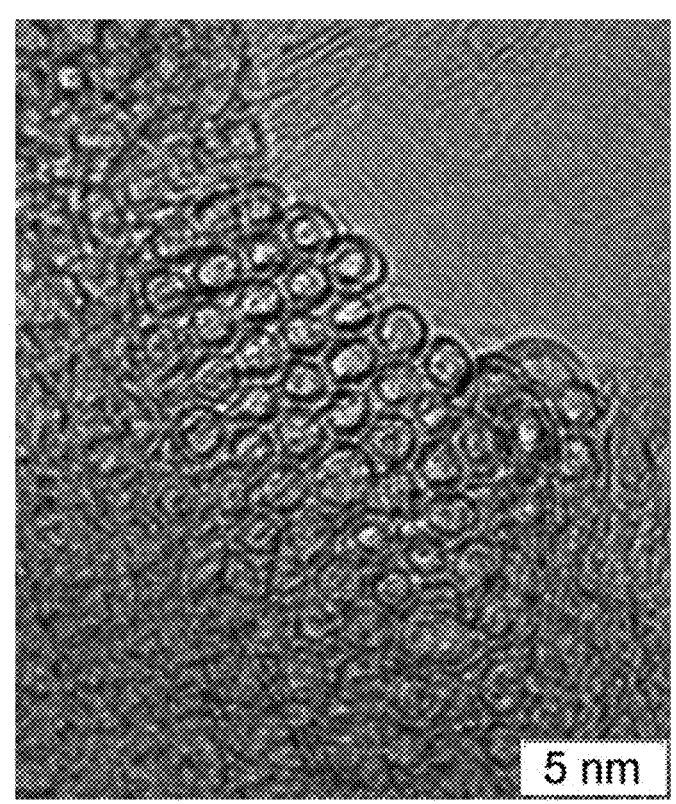
FIG. 10 shows an electronic microphotograph (TEM) of the dry residue of the suspension (S) used in Example 4.

The anode slurry was produced similarly to Example 1, however, as the suspension (S) an aqueous suspension of a mixture of single-walled and double-walled carbon nanotubes with diameters of 1.2 to 2.8 nm and mean diameter of 1.8 nm (diameter was determined using TEM of the dry residue of the suspension, as well from the position of the breathing mode bands in the Raman spectra) was used, and after the step of introducing the composition (C) into the suspension (S), a latex of styrene-butadiene rubber was added to the mixture, and the resultant mixture was mixed to obtain a homogeneous slurry. The ratio of intensities of G/D bands in the Raman spectrum is 34. The presence of double-walled carbon nanotubes bundled together with single-walled carbon nanotubes is confirmed by electronic microphotographs shown in FIG. 10. The concentration of carbon nanotubes in the aqueous suspension (S) is 0.05 wt. %. The suspension also comprises 0.1 wt. % of Li-carboxymethyl cellulose (Li-CMC) as a dispersant.

The fraction of carbon nanotubes in long bundles of carbon nanotubes with the length more than 10 $\mu$m is 12 wt. % of the total amount of carbon nanotubes in the suspension. Based on the DLS data, the bundles of nanotubes are distributed bimodally, with the modes at hydrodynamic diameters 360 nm and about 6 $\mu$m (the second maximum is very weak).

2.0 g of the composition (C) and simultaneously 0.3 g of 20 wt. % latex of butadiene-styrene rubber were added to 30 g of the suspension (S), and mixed until a homogeneous slurry was obtained. The dry matter of the obtained anode slurry comprises 94.9 wt. % of the active component, 2.9% of styrene-butadiene rubber of carbon nanotubes, 1.47% of Li-carboxymethyl cellulose, and 0.73 wt. % of carbon nanotubes. 12 wt. % of carbon nanotubes in the resultant slurry are bundled single-walled and double-walled carbon nanotubes with the bundle length of more than 10 μtm. The bundles of single-walled and double-walled carbon nanotubes are distributed by the bundle length bimodally, with the more intense mode at the length of 3.6 μm.

The anode was produced from the obtained anode slurry similarly to Example 1. The initial specific capacity of the anode at charge current 2 A/g of the anode material is 1481 mA·h/g of the anode material. After 50 charge-discharge cycles (charge current 2 A/g, discharge current 1 A/g), the specific capacity of the anode is 1284 mA·h/g. After 500 cycles, the specific capacity of the anode is 1193 mA·h/g, i.e., less than 80% of the initial specific capacity. 12 wt. % of carbon nanotubes in the anode are bundled single-walled and double-walled carbon nanotubes with the bundle length of more than 10 μm. The bundles of single-walled and double-walled carbon nanotubes are distributed by the bundle length bimodally, with a more intense distribution mode at the length of 3.6 μm.

Example 5

The anode slurry was produced similarly to Example 2, however, a suspension of a mixture of single-walled and multi-walled carbon nanotubes in N-methylpyrrolidone (NMP) was used as the suspension (S), and a solution of Li salt of polyacrylic acid in NMP was added to it simultaneously with introduction of the composition (C) into the suspension (S), and the obtained mixture was mixed to obtain a homogeneous slurry. The concentration of single-walled carbon nanotubes in the suspension (S) is 0.4 wt. %, the concentration of multi-walled carbon nanotubes is 3.0 wt. %. The mean diameter of single-walled carbon nanotubes is 1.6 nm, the mean diameter of multi-walled carbon nanotubes is 10 nm (the diameter was determined using TEM of the dry residue of the suspension, and for single wall carbon nanotubes also from the position of the radial breathing mode (RBM) bands in the Raman spectra). The ratio of intensities of G/D bands in the Raman spectrum of the suspension dry residue is 7. The suspension also contains 1.0 wt. % of polyvinylpyrrolidone (PVP) as a dispersant.

The fraction of single-walled carbon nanotubes in long bundles of carbon nanotubes having the length more than 10 μm determined by comparing optical density at 500 nm of the suspension (S), and the suspension after removal of long bundles from it by sedimentation via centrifuging, is 6 wt. % of the total amount of carbon nanotubes in the suspension. Based on the DLS data, the particles in the suspension have a broad asymmetric unimodal distribution with the mode at hydrodynamic diameter 300 nm.

7.0 g of the composition (C) and simultaneously 10.0 g of 3 wt. % solution of Li salt of polyacrylic acid (Li-PA) in NMP were added to 30 g of the suspension (S), and the mixture was mixed to obtain a homogeneous slurry. The dry matter of the obtained homogeneous anode slurry comprises 80.8 wt. % of the active component and 12.1 wt. % of carbon nanotubes. 6 wt. % of carbon nanotubes in the resultant slurry are bundled single-walled carbon nanotubes with the bundle length of more than 10 μm. The bundles of carbon nanotubes in the anode slurry are distributed by length, with the mode at bundle length of less than 3 μm.

The anode was produced from the obtained anode slurry similarly to Example 2. The initial specific capacity of the anode at charge current 2 A/g of the anode material is 963 mA·h/g of the anode material. After 50 charge-discharge cycles (charge current 2 A/g, discharge current 1 A/g), the specific capacity of the anode is 928 mA·h/g. After 500 cycles, the specific capacity of the anode is 795 mA·h/g, i.e., less than 82% of the initial specific capacity. 6 wt. % of carbon nanotubes in the anode are bundled single-walled carbon nanotubes with the bundle length of more than 10 μm. The bundles of carbon nanotubes in the anode are distributed by length, with the mode at a bundle length of less than 3μm.

Example 6

Figure 11:
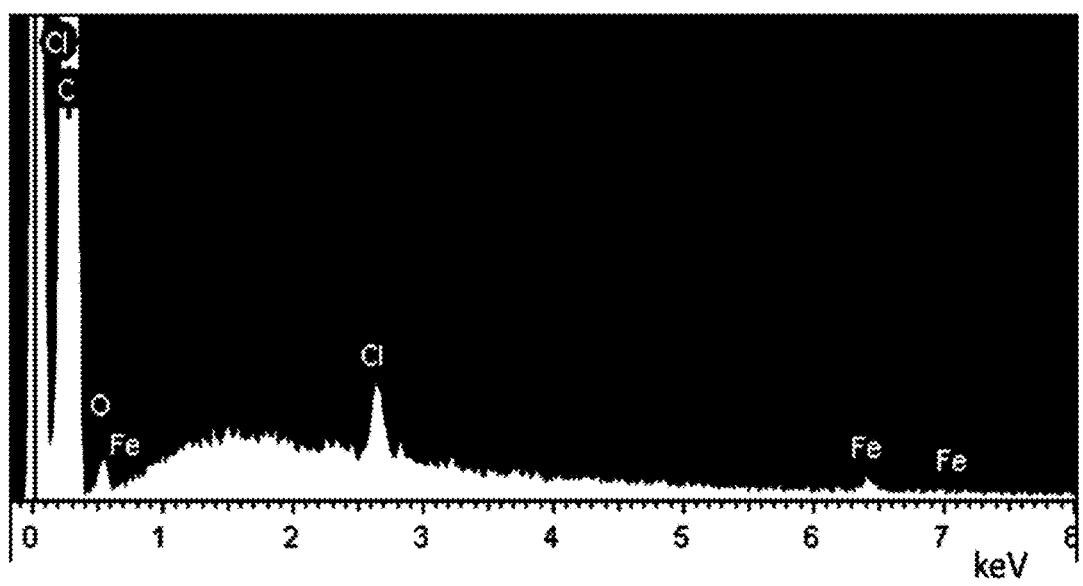
FIG. 11 shows an energy dispersion spectrum (EDS) of the dry residue of the suspension (S) used in Example 6.

The anode slurry was produced similarly to Example 2, however, a suspension of single-walled carbon nanotubes comprising on their surface functional groups containing chlorine and functional groups containing oxygen in dimethylacetamide (DMAA) was used as the suspension (S), and after the step of introducing the composition (C) into the suspension (S), dispersant polyvinylpyrrolidone was added to the obtained mixture, and then the obtained mixture was mixed to produce a homogeneous slurry. The suspension contains 0.6 wt. % of single-walled carbon nanotubes in N-methylpyrrolidone. According to the results of elemental analysis by energy dispersive spectroscopy (EDS), the dry residue of the suspension comprises 97.1 wt. % of carbon; 2.2 wt. % of oxygen; 0.27 wt. % of iron, and 0.47 wt. % of chlorine. The EDS spectrum of the modified material is provided in FIG. 11. Thus, the carbon nanotubes in the suspension (S) comprise on their surface more than 0.47 wt. % of functional groups containing chlorine and more than 2.2 wt. % of functional groups containing oxygen.

According to Raman spectroscopy results for light wavelength 532 nm, the ratio of integral intensities of the G mode and D mode is 97. Single-walled carbon nanotubes are distributed by diameter in the range of 1.2 to 2.8 nm with a mean diameter of 1.6 nm (the diameter was determined using TEM of the dry residue of the suspension, as well as from the positions of the breathing mode bands in the Raman spectra).

The fraction of carbon nanotubes in long bundles of carbon nanotubes with the length more than 10 μm determined by comparing optical density at 500 nm of the suspension (S), and the suspension after removal of long bundles from it by sedimentation via centrifuging, is 28 wt. % of the total amount of carbon nanotubes in the suspension. Based on the DLS data, bundles of carbon nanotubes are distributed by hydrodynamic diameters bimodally, with modes at 420 nm (more intense one) and 6.5 μm (less intense one).

2.0 g of the composition (C) was added to 30 g of the suspension (S) and mixed, and then 1.5 g of 5 wt. % solution of polyvinylpyrrolidone in DMAA was added to the mixture, and mixed until a homogeneous slurry was obtained. The dry matter of the obtained anode slurry comprises 88.4 wt. % of the active component, 3.4 wt. % of polyvinylpyrrolidone, and 8.2 wt. % of single-walled carbon nanotubes. 28 wt. % of carbon nanotubes in the resultant slurry are bundled single-walled carbon nanotubes with the bundle length of more than 10 μm. The bundles of single-walled carbon nanotubes in the anode slurry are distributed by length bimodally, with a more intense mode at the length of less than 4.2 μm.

The anode was produced from the obtained anode slurry similarly to Example 2. The initial specific capacity of the anode at charge current 2 A/g of the anode material is 1122 mA·h/g of the anode material. After 50 charge-discharge cycles (charge current 2 A/g, discharge current 1 A/g), the specific capacity of the anode is 1081 mA·h/g. After 500 cycles, the specific capacity of the anode is 931 mA·h/g, i.e., less than 83% of the initial specific capacity. 28 wt. % of carbon nanotubes in the resultant slurry are bundled single-walled carbon nanotubes with the bundle length of more than 10 μm. The bundles of single-walled carbon nanotubes in the anode are distributed by length bimodally, with a more intense mode at a length of less than 4.2 μm.

Example 7

The anode slurry was produced similarly to Example 2, however, a suspension of 0.25 wt. % of single-walled carbon nanotubes modified with fluorine in N-methylpyrrolidone was used as the suspension (S), and after mixing (S) with the composition (C), a powder of polyvinylidene fluoride (PVDF) was added to the mixture. Single-walled carbon nanotubes in the suspension were modified with fluorine. Based on the TEM data, carbon nanotubes in the suspension are single-walled with mean diameter 1.5 nm, which is also confirmed by data on the position of absorption bands $S_{1-1}$ in the optical absorption spectrum. Based on the data of X-Ray Photoemission Spectroscopy (XPS), the weight fraction of fluorine in carbon nanotubes is 14%, the weight fraction of oxygen is 7%, and carbon to balance. The G/D ratio in the Raman spectrum at wavelength 532 nm is 2.4. Such a low G/D value also confirms a high degree of functionalization of the SWCNT surface with fluorine-containing functional groups.

Figure 12:
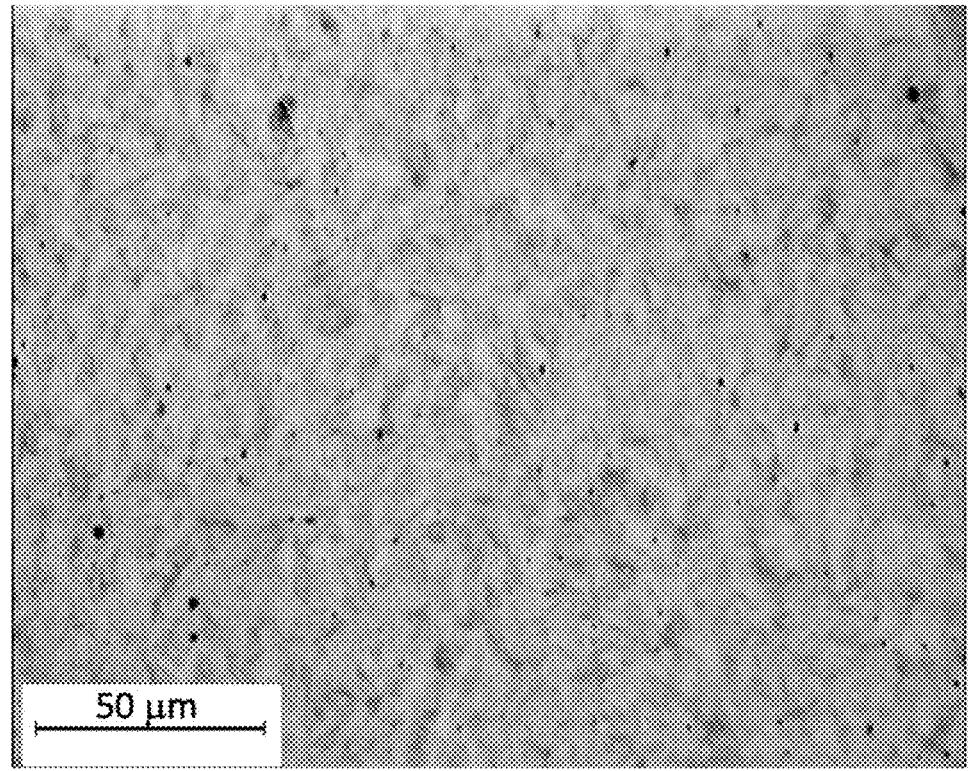
FIG. 12 shows a microphotograph of the suspension (S) used in Example 7.

A microphotograph of the suspension (S) is provided in FIG. 12. The fraction of carbon nanotubes in long bundles of carbon nanotubes with the length more than 10 μm determined by comparing optical density at wavelength 500 nm of the suspension (S), and the suspension after removal of long bundles from it by sedimentation via centrifuging, is 9 wt. % of the total amount of carbon nanotubes in the suspension. Based on the DLS data, bundles of carbon nanotubes are distributed by hydrodynamic diameters bimodally, with modes at 370 nm (more intense one) and 4.8 μm (less intense one).

30 g of the suspension (S) was placed into a 100 cm³ beaker, and then 2.375 g of the composition (C) was added, and mixed using an overhead stirrer with a disk impeller at impeller rotation speed 2000 rpm for 0.5 hours, then 50 mg of polyvinylidene fluoride powder was added, and mixed under the same conditions for another 2 hours until a homogeneous slurry was obtained. The dry matter of the obtained anode slurry comprises 95 wt. % of the active component, 3 wt. % of carbon nanotubes, 2 wt. % of polyvinylidene fluoride. 9 wt. % of carbon nanotubes in the resultant slurry are bundled single-walled carbon nanotubes with the bundle length of more than 10 μm. The bundles of single-walled carbon nanotubes are distributed by the bundle length bimodally, with a lesser mode at a bundle length of less than 3.7 μm.

The anode was produced from the obtained anode slurry similarly to Example 2. The load of the active material on the anode is 2.4 mg/cm². An anode with area 17.5 cm² was cut from the foil with anode material, to which a nickel lead was welded. No carbon nanotubes other than those introduced with the anode slurry were introduced into the anode. Thus, 9 wt. % of carbon nanotubes in the resultant slurry are bundled single-walled carbon nanotubes with the bundle length of more than 10 μm. The bundles of single-walled carbon nanotubes are distributed by the bundle length bimodally, with a lesser mode at a bundle length of less than 3.7 μm.

Figure 13:
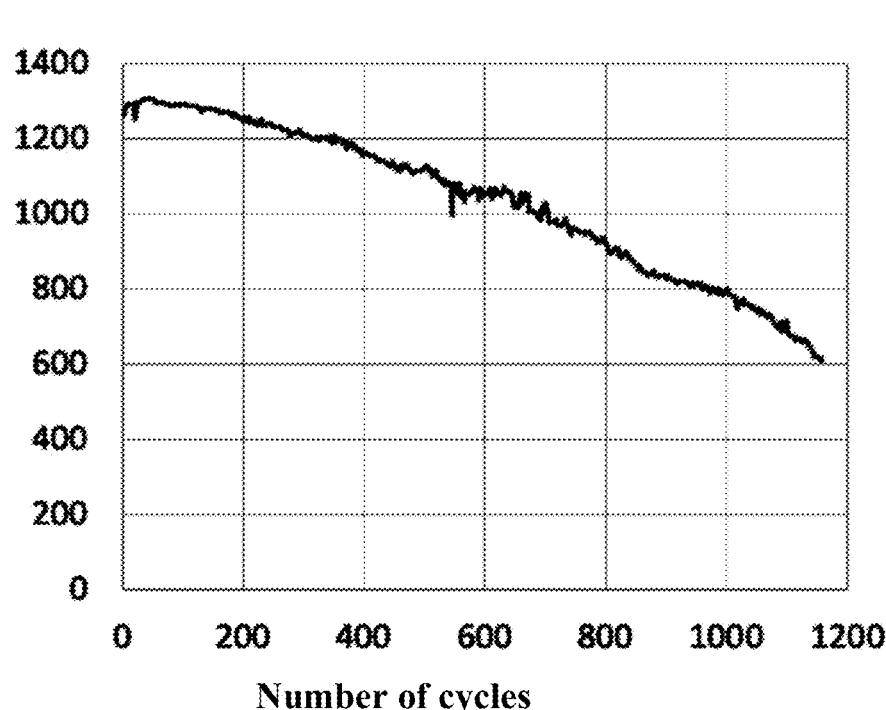
FIG. 13 shows specific capacity of the anode of Example 7 versus the number of charge-discharge cycles (charge current 2 A/g, discharge current 1 A/g).

To determine anode properties, a cell was assembled with a Li cathode and Li reference electrode and electrolyte using 1 M solution of $LiPF_6$ in the solvent mixture propylene carbonate:ethylmethyl carbonate:dimethyl carbonate in volume ratio 1:1:1 with addition of 5% v/v fluoroethylene carbonate. The initial specific capacity of the anode at charge current 2 A/g of the anode material is 1257 mA·h/g of the anode material. The specific capacity vs the number of charge-discharge cycles (charge current 2 A/g, discharge current 1 A/g) is shown in FIG. 13. Within first 50 cycles, the specific capacity of the anode grows from 1257 to 1302 mA·h/g. After 500 cycles, the specific capacity of the anode is 1117 mA·h/g, i.e., less than 88% of the initial specific capacity.

Figure 14:
FIG. 14 shows capacity of the lithium-ion battery of Example 7 referred to its initial capacity versus the number of charge-discharge cycles (charge and discharge currents 37.5 mA).
Figure 14:
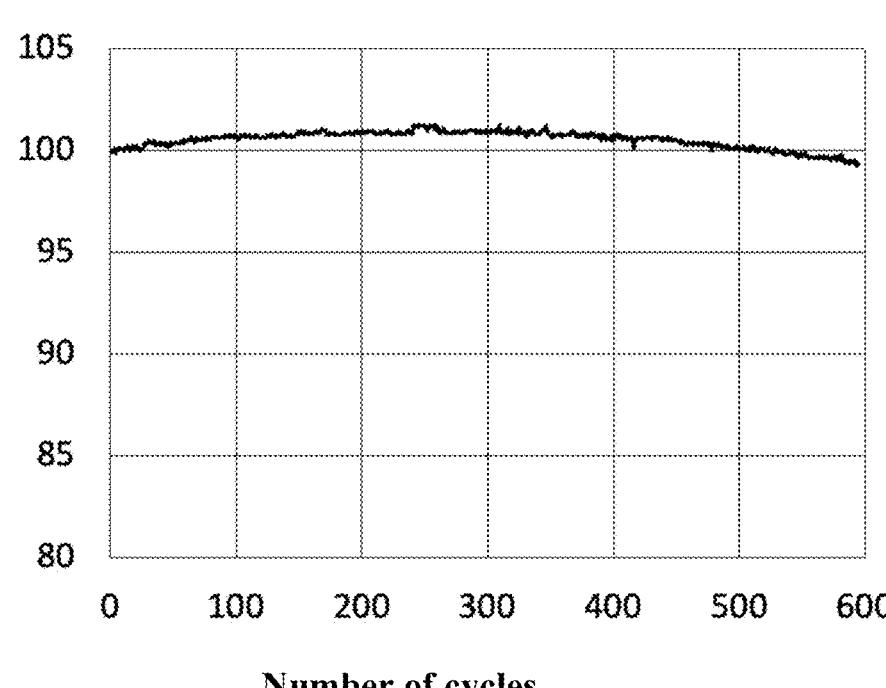

A lithium-ion battery was assembled from the obtained anode and a cathode having lithium-iron-phosphate, $LiFePO_4$ (LFP), as the active material at a load of 14 mg/cm². A 10 μm lithium foil was placed on the anode to increase the coulombic efficiency of the first cycle. A 25 μm thick polypropylene separator was used. 1 M solution of $LiPF_6$ in the solvent mixture propylene carbonate:ethylmethyl carbonate:dimethyl carbonate in volume ratio 1:1:1 with addition of 5% v/v fluoroethylene carbonate was used as an electrolyte. The initial capacity of the battery at discharge current 0.1 C was 37.5 mA·h. The capacity referred to the initial capacity versus the number of charge-discharge cycles (charge and discharge currents 37.5 mA) is shown in FIG. 14. Within first 200 cycles, the battery somewhat increases its capacity. After 500 cycles, the capacity of the battery is 37.5 mA·h, i.e., 100% of the initial capacity.

Example 8

The anode slurry was produced similarly to Example 1, however, after adding the composition (C) to the suspension (S) and mixing, graphite was additionally introduced, mixed, and styrene-butadiene latex was further added, after which it was mixed to until a homogeneous slurry was obtained.

225 g of the suspension (S) was placed into a 400 cm³ beaker, to which then 13.5 g of the composition (C) was added and mixed using an overhead stirrer with a disk impeller at impeller rotation speed 2000 rpm for 0.5 hours; then 13.5 g of graphite with the BET specific surface of 3 m²/g was added, and mixed for 2 hours; then 3.5 g of 20 wt. % of styrene-butadiene latex were added, and mixed under the same conditions for another 2 hours until a homogeneous slurry was obtained. The dry matter of the obtained anode slurry comprises 50.1 wt. % of the composition (C), 3 wt. % of carbon nanotubes, 40 wt. % of graphite, 4.5 wt. % of carboxymethyl cellulose, and 2.3 wt. % of styrene-butadiene rubber. 19 wt. % of carbon nanotubes in the resultant slurry are bundled single-walled carbon nanotubes with the bundle length of more than 10 μm. The bundles of single-walled carbon nanotubes are distributed by length bimodally, with the more intense mode at the length of less than 4μm.

To produce the anode, the obtained anode slurry was applied on copper foil using a doctor blade, dried at 50° C. for 1 hour, and compactified at a calender with a 7 t force to a density of the anode material of 1.4 g/cm³. The load of the active material on the anode is 3.2 mg/cm². An anode with area 17.5 cm² was cut from the foil with anode material, to which a nickel lead was welded. No carbon nanotubes other than those introduced with the anode slurry were introduced into the anode. Thus, 19 wt. % of carbon nanotubes in the anode are bundled single-walled carbon nanotubes with the bundle length of more than 10 μm. The bundles of single-walled carbon nanotubes in the anode are distributed by length bimodally, with a more intense mode at the length of less than 4 μm.

Figure 15:
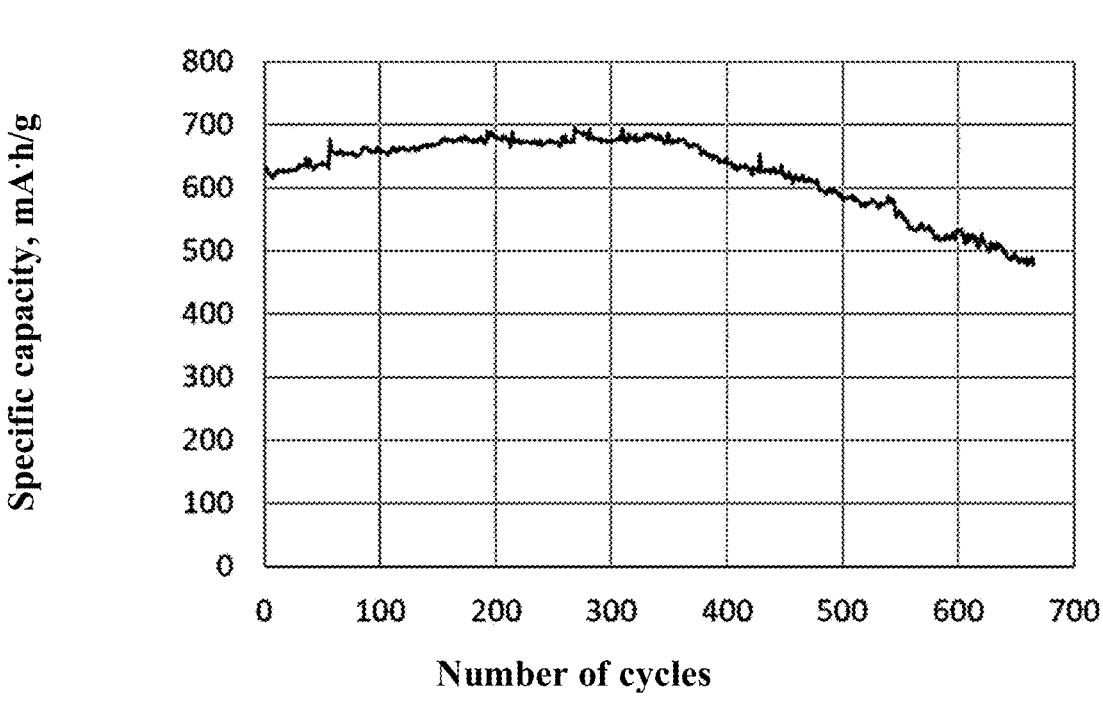
FIG. 15 shows specific capacity of the anode of Example 8 versus the number of charge-discharge cycles (charge current 2 A/g, discharge current 1 A/g).

To determine anode properties, a cell was assembled with a Li cathode and Li reference electrode and electrolyte using 1 M solution of $LiPF_6$ in the solvent mixture of propylene carbonate:ethylmethyl carbonate:dimethyl carbonate in volume ratio 1:1:1 with addition of 3% v/v vinyl carbonate. The initial specific capacity of the anode at charge current 2 A/g of the anode material is 634 mA·h/g of the anode material. The specific capacity vs the number of charge-discharge cycles (charge current 2 A/g, discharge current 1 A/g) is shown in FIG. 15. Within the first 300 cycles, the specific capacity of the anode grows up to 670-690 mA·h/g. After 500 cycles, the specific capacity of the anode is 581 mA·h/g, i.e., less than 91% of the initial specific capacity.

Example 9 (Comparative)

The anode slurry was produced similarly to Example 1, however, using an aqueous suspension (S) of single-walled carbon nanotubes (SWCNT) TUBALL containing almost no long bundles of single-walled carbon nanotubes with the length more than 10 μm. The absence of any significant amount of such bundles is confirmed by the optical microscopy data, which show no fibrous particles visible in an optical microscope, as well as the DLS data, which show no particles with hydrodynamic diameter more than 800 nm: based on the DLS data, a bimodal particle distribution with modes in the range of hydrodynamic diameters about 90 nm and 380 nm is observed in the suspension, the lesser mode probably corresponding to an individual carbon nanotube and very thin bundles, while the second mode corresponding to the bundles of carbon nanotubes with the length less than 6 μm. The larger mode of the length distribution of bundles of carbon nanotubes is less than 3.8 μm. The DLS curves for the suspension (S) are provided in FIG. 1 by a curve with triangular markers.

The fraction of carbon nanotubes contained in bundles with the length more than 10 μm was determined by comparing optical density at 500 nm of the suspension (S), and the suspension after removal of long bundles from it by sedimentation via centrifuging similarly to Example 1. The optical density of the suspension (S) diluted 400 times at the optical path length 10 mm is 0.58, which corresponds to the SWCNT concentration in the suspension (S) of 0.39 wt. %. The optical density of the suspension (S) diluted 400 times and subjected to sedimentation is 0.56, which corresponds to the SWCNT concentration in the suspension (S) of 0.38 wt. %. Thus, the fraction of carbon nanotubes in long bundles of carbon nanotubes with the length more than 10 μm is less than 3 wt. % of the total amount of carbon nanotubes in the suspension.

The ratio of intensities of G/D bands for the dry residue of this suspension (S) is 87. As in Example 1, the SWCNT concentration in the suspension is 0.4 wt. %, and the suspension also contains 0.6 wt. % of Na-carboxymethyl cellulose (CMC) as a dispersant.

As in Example 1, the dry matter of the obtained anode slurry comprises 90 wt. % of the active component, 3 wt. % of carbon nanotubes, 4.5 wt. % of Na-CMC, and 2.5 wt. % of butadiene-styrene rubber.

The procedures of anode manufacture and cell assembly for its testing were similar to Example 1. The initial specific capacity of the anode at charge current 2 A/g of the anode material is 1241 mA·h/g of the anode material, which is very close to the anode capacity according to Example 1. However, already by cycle 50 (charge current 2 A/g, discharge current 1 A/g), the specific capacity of the anode drops down to 1056 mA·h/g. After 500 cycles, the specific capacity of the anode is 712 mA·h/g, i.e., less than 58% of the initial specific capacity. Thus, the absence of long bundles of carbon nanotubes in the suspension (S) negatively affects the number of cycles that the anode supports until loosing 20% of its initial capacity. The presence of bundles of carbon nanotubes with the length more than 10 μm in the suspension (S) is required to achieve the claimed technical result.

Industrial Applicability

The present invention can be used in electrotechnical industry, more particularly in the production of lithium-ion batteries, lithium-ion batteries with silicon-containing negative electrodes (anodes), as well as in the production of anodes for lithium-ion batteries.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention.

List of Cited References (All Incorporated Herein by Reference in Their Entirety)

Patent Literature

Patent Literature 1: U.S. Pat. No. 8,263,265
Patent Literature 2: U.S. Pat. No. 8,617,746
Patent Literature 3: Patent EP 2755263 B1
Patent Literature 4: U.S. Pat. No. 8697286
Patent Literature 5: Patent RU 2717516 C2

Non-Patent Literature

Non-Patent Literature 1: N. Nair, W. Kim, R. D. Braatz, M. S. Strano, *Dynamics of Surfactant-Suspended single-walled Carbon Nanotubes in a Centrifugal Field,* Langmuir, 2008, Vol. 24, pp.1790-1795, doi: 10.1021/1a702516u Non-Patent Literature 2: J. Gigault, I. Le Hécho, S. Dubascoux, M. Potin-Gautier, G. Lespes, *Single-walled carbon nanotube length determination by asymmetrical-flow field-flow fractionation hyphenated to multi-angle laser-light scattering,* J. Chromatogr. A, 2010, Vol. 1217, pp. 7891-7897

What is claimed is:

1. A method for producing an anode slurry for a lithium-ion battery, comprising the steps of:
   (1) adding a composition (C) comprising an active component that includes silicon and/or silicon oxides ($SiO_x$), where x is between 0 and 2 (inclusive), into a liquid-phase suspension(S) that comprises carbon nanotubes, a dispersant, and a solvent, with the carbon nanotubes being between 0.01 and 5 wt. % of the suspension,
   wherein more than 5 wt. % but not more than 54 wt % of carbon nanotubes of the total carbon nanotubes in the suspension (S) are bundled single-walled and/or double-walled carbon nanotubes with a bundle length of more than 10 μm but less than 70 μm, and
   wherein a hydrodynamic diameter distribution of the bundles in the suspension (S) has a local maximum between 300 nm and 500 nm, (1.5) adding graphite and/or binder to the suspension (S), and (2) mixing the composition (C) and the suspension (S) until a homogeneous anode slurry is obtained, wherein, after step (2), solid matter of the homogeneous anode slurry includes more than 50 wt. % and less than 99.9 wt. % of the active component, and wherein, after step (2), the solid matter includes more than 0.1 wt. % and less than 20 wt. % of carbon nanotubes, and wherein any remaining solid matter is the graphite and/or the dispersant and/or the binder.

2. The method of claim 1, wherein the hydrodynamic diameter distribution in the suspension (S) has multiple local maxima.

3. The method of claim 1, wherein the binder is any of Na salt of carboxymethyl cellulose, Li salt of polyacrylic acid, latex of styrene butadiene rubber, polyvinylidene fluoride, or polyvinylpyrrolidone, and the solvent is water or 1-methyl-2-pyrrolidone.

4. The method of claim 1, wherein sizes of X-ray coherent-scattering domains for both silicon and silicon oxides are less than 10 nm.

5. The method of claim 1, wherein the carbon nanotubes in the suspension (S) have a ratio of Raman spectrum intensities of D/G bands between 0 and 0.2 at 532 nm.

6. The method of claim 5, wherein the carbon nanotubes in the suspension (S) have a ratio of Raman spectrum intensities of D/G bands between 0 and 0.02 at 532 nm.

7. The method of claims claim 1, wherein the suspension (S) is an aqueous suspension or a suspension in a polar organic solvent with a dipole moment of more than 1.5 Debye.

8. The method of claim 7, wherein the suspension (S) is a suspension in N-methylpyrrolidone solvent.

9. The method of claim 1, wherein the dispersant is any of Li salt of carboxymethyl cellulose, Na salt of carboxymethyl cellulose, Li salt of polyacrylic acid, Na salt of polyacrylic acid and polyvinylidene fluoride.

10. A method of producing an anode for a lithium-ion battery, comprising:

(1) adding a composition (C) comprising an active component that includes silicon and/or silicon oxides (SiO$_x$), where x is a number between 0 and 2 (inclusive), or a combination of silicon and silicon oxides with a total atomic ratio of oxygen: silicon contents in the combination of more than 0 and less than 1.8, into a liquid-phase suspension (S) that comprises carbon nanotubes, a solvent and a dispersant, with the carbon nanotubes being between 0.01 and 5 wt. % of the suspension, wherein more than 5 wt. % but not more than 54 wt. % of carbon nanotubes of the total carbon nanotubes in the suspension (S) are bundled single-walled and/or double-walled carbon nanotubes with a bundle length of more than 10 μm but less than 70 μm, and wherein a hydrodynamic diameter distribution of the bundles in the suspension (S) has a local maximum between 300 nm and 500 nm, (1.5) adding graphite and/or binder to the suspension (S), and (2) mixing the composition (C) and the suspension (S) until a homogeneous anode slurry is obtained, wherein, after step (2), solid matter of the mixture includes more than 0.1 wt. % and less than 20 wt. % of carbon nanotubes includes more than 50 wt. % and less than 99.9 wt. % of the active component, and wherein the solid matter includes more than 0.1 wt. % and less than 20 wt. % of carbon nanotubes, (3) applying the homogeneous anode slurry on a current collector of a lithium-ion battery;

(4) drying the applied homogeneous anode slurry to form an anode of the lithium-ion battery; and (5) compacting the anode.

11. A method for producing an anode slurry for a lithium-ion battery, comprising the steps of:

(1) adding a composition (C) comprising an active component that includes silicon and/or silicon oxides, into a liquid-phase suspension (S) that comprises carbon nanotubes, a solvent and a dispersant, with the carbon nanotubes being between 0.01 and 5 wt. % of the suspension, wherein more than 5 wt. % but not more than 54 wt % of carbon nanotubes of the total carbon nanotubes in the suspension (S) are bundled single-walled and/or double-walled carbon nanotubes with a bundle length of more than 10 μm but less than 70 μm, (1.5) adding graphite and/or binder to the suspension (S), and (2) mixing the composition (C) and the suspension (S) until the anode slurry is obtained, wherein, after step (2), solid matter of the anode slurry includes more than 50 wt. % and less than 99.9 wt. % of the active component, and wherein any remaining solid matter is graphite and/or binder and/or dispersant.

12. An anode slurry for a lithium-ion battery, comprising:

(1) an active component that includes silicon and/or silicon oxides (SiO$_x$), where x is a number between 0 and 2 (inclusive), or a combination of silicon and silicon oxides, and (2) carbon nanotubes, (3) solvent, and (4) dispersant and/or binder, wherein more than 5 wt. % but not more than 54 wt. % of carbon nanotubes of the total carbon nanotubes in the anode slurry are bundled single-walled and/or double-walled carbon nanotubes with a bundle length of more than 10 μm and less than 70 μm, and wherein a bundle length distribution of the bundles in the anode slurry has a local maximum between 1.5 μm and 5 μm, and wherein solid matter of the anode slurry includes more than 50 wt. % and less than 97 wt. % of the active component, and wherein the solid matter of the anode slurry includes between 3 wt. % and 20 wt. % of carbon nanotubes, and wherein remaining portion of the solid matter is the dispersant and/or the binder and/or the graphite.

13. The anode slurry of claim 12, wherein the binder is selected from any of: latex of styrene-butadiene rubber, Li salt of carboxymethyl cellulose, Li salt of polyacrylic acid, fluoroelastomer, and latex of fluoroelastomer.

14. An anode for a lithium-ion battery comprising:

(1) a current collector;

(2) an active component that includes silicon and/or silicon oxides (SiO$_x$), where x is a number between 0 and 2 (inclusive), and (3) carbon nanotubes, wherein more than 5 wt. % but not more than 54 wt. % of the carbon nanotubes of the total carbon nanotubes in the anode are bundled single-walled and/or double-walled carbon nanotubes with a bundle length of more than 10 μm, wherein a bundle length distribution of the bundles of carbon nanotubes in the anode has a local maximum between 1.5 μm and 5 μm, wherein the active component makes up more than 50 wt. % and less than 97 wt. % of the weight of the anode excluding current collector, and wherein the carbon nanotubes make up between 3 wt. % and 20 wt. % of the weight of the anode excluding the current collector.

15. The anode slurry of claim 14, wherein the binder is a latex of styrene-butadiene rubber or a latex of fluoroelastomer.

16. The anode slurry of claim 14, wherein the binder is a Li salt of carboxymethyl cellulose or a Li salt of polyacrylic acid.

17. The anode slurry of claim 14, wherein the binder is a fluoroelastomer or polyvinylidene fluoride.

\* \* \* \* \*